(12) United States Patent
Lee et al.

(10) Patent No.: US 11,861,281 B2
(45) Date of Patent: *Jan. 2, 2024

(54) COMPUTER-IMPLEMENTED METHOD AND COMPUTING SYSTEM FOR DESIGNING INTEGRATED CIRCUIT BY CONSIDERING TIMING DELAY

(71) Applicant: SAMSUNG ELECTRONICS CO., LTD., Suwon-si (KR)

(72) Inventors: Jong-pil Lee, Suwon-si (KR); Bong-il Park, Seongnam-si (KR); Moon-su Kim, Gimpo-si (KR); Sun-ik Heo, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/966,993

(22) Filed: Oct. 17, 2022

(65) Prior Publication Data
US 2023/0037826 A1 Feb. 9, 2023

Related U.S. Application Data

(60) Continuation of application No. 17/156,738, filed on Jan. 25, 2021, now Pat. No. 11,475,195, which is a
(Continued)

(30) Foreign Application Priority Data

Apr. 28, 2017 (KR) .......................... 10-2017-0055660

(51) Int. Cl.
*G06F 30/3323* (2020.01)
*G06F 30/392* (2020.01)
(Continued)

(52) U.S. Cl.
CPC ...... *G06F 30/3323* (2020.01); *G06F 30/3312* (2020.01); *G06F 30/392* (2020.01);
(Continued)

(58) Field of Classification Search
CPC ............... G06F 30/3323; G06F 17/504; G06F 17/5072; G06F 17/5077
(Continued)

(56) References Cited

U.S. PATENT DOCUMENTS 5,572,437 A * 11/1996 Rostoker ................. G06F 30/33
716/108
5,987,086 A * 11/1999 Raman ................... G06F 30/394
716/120
(Continued)

FOREIGN PATENT DOCUMENTS

| CN | 101482893 A | 7/2009 |
|---|---|---|
| CN | 101506810 A | 8/2009 |

(Continued)

OTHER PUBLICATIONS

Communication dated Feb. 14, 2023 by the State Intellectual Property Office of P.R. China in counterpart Chinese Patent Application No. 201810160711.3.
(Continued)

*Primary Examiner* — Suresh Memula
(74) *Attorney, Agent, or Firm* — Sughrue Mion, PLLC

(57) ABSTRACT

A computer-readable storage medium that stores computer program code which, when executed by one or more processors, causes the one or more processors to execute tools for designing an integrated circuit (IC). The tools include a placing and routing tool that generates layout data and wire data corresponding to a net included in the IC by placing and routing standard cells defining the IC, the wire data including physical information of a wire implementing the net, and
(Continued)

a timing analysis tool that calculates a wire delay with respect to the wire corresponding to the net, based on the physical information, updates the wire delay based on process variation of the wire, and calculates a timing slack by using the updated wire delay.

20 Claims, 18 Drawing Sheets

Related U.S. Application Data division of application No. 15/862,296, filed on Jan. 4, 2018, now Pat. No. 10,902,168.

(51) Int. Cl.
  *G06F 30/3312* (2020.01)
  *G06F 30/398* (2020.01)
  *G06F 30/394* (2020.01)
  *G06F 111/04* (2020.01)
  *G06F 111/20* (2020.01)
  *G06F 119/06* (2020.01)
  *G06F 119/12* (2020.01)

(52) U.S. Cl.
  CPC .......... *G06F 30/394* (2020.01); *G06F 30/398* (2020.01); *G06F 2111/04* (2020.01); *G06F 2111/20* (2020.01); *G06F 2119/06* (2020.01); *G06F 2119/12* (2020.01)

(58) Field of Classification Search
  USPC ....................................................... 716/113
  See application file for complete search history.

(56) References Cited

U.S. PATENT DOCUMENTS

| | | | |
|---|---|---|---|
| 6,189,131 B1* | 2/2001 | Graef | G06F 30/39 716/113 |
| 6,381,730 B1* | 4/2002 | Chang | G06F 30/367 716/136 |
| 6,789,248 B1* | 9/2004 | Lu | G06F 30/39 716/113 |
| 7,111,268 B1 | 9/2006 | Anderson et al. | |
| 7,526,743 B2 | 4/2009 | Arp et al. | |
| 7,594,203 B2 | 9/2009 | de Dood et al. | |
| 7,669,161 B2* | 2/2010 | Lin | G06F 30/39 716/55 |
| 7,673,260 B2 | 3/2010 | Chen et al. | |
| 7,882,464 B1* | 2/2011 | Rochel | G06F 30/367 716/113 |
| 7,882,471 B1* | 2/2011 | Kariat | G06F 30/367 716/113 |
| 8,160,858 B2* | 4/2012 | Tseng | G06F 30/367 703/13 |
| 8,245,165 B1* | 8/2012 | Tiwary | G06F 30/3312 716/108 |
| 8,255,851 B1 | 8/2012 | Baransy et al. | |
| 8,312,406 B2* | 11/2012 | Song | G06F 30/398 716/108 |
| 8,336,010 B1 | 12/2012 | Chang et al. | |
| 8,336,015 B2 | 12/2012 | Qiao et al. | |
| 8,381,160 B2 | 2/2013 | Izuha | |
| 8,453,102 B1* | 5/2013 | Pack | G06F 30/327 716/139 |
| 8,473,886 B2 | 6/2013 | Sripada et al. | |
| 8,504,978 B1 | 8/2013 | Bhardwaj et al. | |
| 8,595,669 B1* | 11/2013 | Keller | G06F 30/3312 716/108 |
| 8,788,995 B1 | 7/2014 | Kumar et al. | |
| 8,863,052 B1* | 10/2014 | Dhuria | G06F 30/367 716/108 |
| 9,418,192 B1 | 8/2016 | Bai et al. | |
| 9,563,734 B2 | 2/2017 | Tam et al. | |
| 9,589,096 B1* | 3/2017 | Gupta | G06F 30/3312 |
| 9,875,333 B1* | 1/2018 | Verma | G06F 30/3312 |
| 10,318,696 B1* | 6/2019 | Yeung | G06F 30/3312 |
| 10,546,093 B2* | 1/2020 | Kim | G06F 30/39 |
| 10,755,009 B1* | 8/2020 | Bradley | G06F 30/3312 |
| 2001/0034595 A1 | 10/2001 | Yamaguchi | |
| 2005/0229142 A1* | 10/2005 | Boppana | G06F 30/367 716/113 |
| 2006/0026544 A1* | 2/2006 | Engel | G06F 30/30 716/52 |
| 2006/0129964 A1 | 6/2006 | Shibasaki et al. | |
| 2008/0034338 A1 | 2/2008 | Hosono | |
| 2008/0127000 A1* | 5/2008 | Majumder | G06F 30/327 716/135 |
| 2008/0276209 A1* | 11/2008 | Albrecht | G06F 30/3312 716/113 |
| 2009/0024973 A1* | 1/2009 | Yamada | G06F 30/367 716/113 |
| 2009/0024974 A1* | 1/2009 | Yamada | G06F 30/367 716/113 |
| 2009/0183132 A1 | 7/2009 | Izuha et al. | |
| 2009/0187866 A1* | 7/2009 | Ou | G06F 30/367 716/136 |
| 2009/0199139 A1* | 8/2009 | White | G06F 30/367 716/106 |
| 2009/0254874 A1* | 10/2009 | Bose | G06F 30/39 716/113 |
| 2010/0077372 A1* | 3/2010 | Xiang | G06F 30/20 716/106 |
| 2010/0083205 A1* | 4/2010 | Ono | G06F 30/3312 716/113 |
| 2010/0176820 A1* | 7/2010 | Asai | G06F 30/367 324/690 |
| 2011/0320990 A1* | 12/2011 | Srinivasan | A61K 39/395 716/102 |
| 2012/0226479 A1* | 9/2012 | Su | G06F 30/398 703/1 |
| 2012/0284680 A1 | 11/2012 | Iyer et al. | |
| 2013/0033277 A1* | 2/2013 | Liao | G06F 30/367 324/750.03 |
| 2013/0055184 A1* | 2/2013 | Shroff | G06F 30/398 716/112 |
| 2013/0091480 A1* | 4/2013 | Horlacher | G06F 30/398 716/113 |
| 2013/0326447 A1 | 12/2013 | Huang et al. | |
| 2015/0169819 A1* | 6/2015 | Hsu | G06F 30/398 716/113 |
| 2015/0254392 A1* | 9/2015 | Onodera | G06F 30/398 716/114 |
| 2016/0034631 A1* | 2/2016 | Wang | G06F 30/398 716/113 |
| 2016/0275230 A1 | 9/2016 | Ahluwalia et al. | |
| 2016/0283643 A1* | 9/2016 | Kim | G06F 30/398 |
| 2016/0364505 A1 | 12/2016 | Kim et al. | |
| 2017/0122998 A1* | 5/2017 | Liu | G06F 30/3312 |
| 2017/0316138 A1* | 11/2017 | Chiang | G06F 30/367 |
| 2017/0344692 A1* | 11/2017 | Oh | G06F 30/398 |
| 2018/0365364 A1* | 12/2018 | Kim | G06F 30/392 |
| 2019/0258775 A1* | 8/2019 | Kim | G06F 30/327 |

FOREIGN PATENT DOCUMENTS

| | | | |
|---|---|---|---|
| EP | 2006784 A1 * | 12/2008 | ......... G06F 17/5031 |
| EP | 2006784 A1 | 12/2008 | |
| JP | 2001-306647 A | 11/2001 | |
| JP | 2004-110522 A | 4/2004 | |
| JP | 4803078 B2 | 10/2011 | |
| JP | 5041882 B2 | 10/2012 | |
| KR | 10-0475014 B1 | 9/2005 | |
| KR | 10-2012-0114328 A | 10/2012 | |
| KR | 10-2015-0083014 A | 7/2015 | |
| WO | 9939288 A2 | 8/1999 | |
| WO | WO-9939288 A2 * | 8/1999 | ......... G06F 17/5045 |

(56) References Cited

OTHER PUBLICATIONS

Communication dated Aug. 18, 2021, issued by the Korean Patent Office in counterpart Korean Patent Application No. 10-2017-0055660.

Communication dated Feb. 22, 2022 by the Korean Intellectual Property Office in counterpart Korean Patent Application No. 10-2017-0055660.

Communication issued by the Chinese Patent Office in CN Patent Application No. 201810160711.3, dated Aug. 1, 2023.

\* cited by examiner

FIG. 7

| NET | METAL LAYER | WIRE LENGTH |
|---|---|---|
| N1 | Ma | $\lambda_a$ |
| N2 | Mb | $\lambda_b$ |
| N3 | Mc | $\lambda_c$ |
| N4 | M2, M3, M4, M5 | $\lambda_2, \lambda_3, \lambda_4, \lambda_5$ |
| N5 | Md | $\lambda_d$ |
| N6 | Me | $\lambda_e$ |
| N7 | Mf | $\lambda_f$ |

D10

| SYMBOL | DESCRIPTION | DETERMINED BY |
|---|---|---|
| $\delta_{total}$ | WIRE DELAY OF A CERTAIN NET | STA |
| $\lambda_m$ | WIRE LENGTH OF METAL LAYER M | P&R TOOL |
| $\tau_m$ | UNIT DELAY OF METAL LAYER M | TECH FILE |
| $\sigma_m$ | VARIATION OF METAL RC TIMING CONSTANT | USER INPUT |

FIG. 16

| NET | METAL LAYER | WIRE LENGTH |
|---|---|---|
| N1 | M1, M2 | $\lambda_1 = 40, \lambda_2 = 60$ |
| N2 | M3 | $\lambda_{3a}$ |
| N3 | M3 | $\lambda_{3b}$ |
| N4 | M4 | $\lambda_{4a}$ |
| N5 | M4 | $\lambda_{4b}$ |

| | WIRE LENGTH (μm) | UNIT DELAY (fs/μm) | FIRST WIRE DELAY (fs) |
|---|---|---|---|
| M1 | $\lambda_1 = 40$ | $\tau_1 = 19.3$ | $\delta_1 = 795.9$ |
| M2 | $\lambda_2 = 60$ | $\tau_2 = 3.3$ | $\delta_2 = 204.1$ |

FIG. 17B

|    | WIRE LENGTH ($\lambda m$) | UNIT DELAY ($\tau m$) | RC VARIATION SCALING FACTOR | SECOND WIRE DELAY (fs) |
|----|---------------------------|------------------------|------------------------------|-------------------------|
| M1 | $\lambda_1 = 40$          | $\tau_1 = 19.3$        | $\sigma_1 = 1.15$            | $\delta_1' = 915.3$     |
| M2 | $\lambda_2 = 60$          | $\tau_2 = 3.3$         | $\sigma_2 = 1.15$            | $\delta_2' = 234.7$     |

FIG. 17C

|    | FIRST WIRE DELAY (fs) | SECOND WIRE DELAY (fs) | WIRE DELAY SKEW (fs) | HOLD SLACK (fs) |
|----|------------------------|-------------------------|-----------------------|------------------|
| M1 | $\delta_1 = 795.9$     | $\delta_1' = 915.3$     | −119.4                | −125             |
| M2 | $\delta_2 = 204.1$     | $\delta_2' = 234.7$     | −30.6                 |                  |

COMPUTER-IMPLEMENTED METHOD AND COMPUTING SYSTEM FOR DESIGNING INTEGRATED CIRCUIT BY CONSIDERING TIMING DELAY

CROSS-REFERENCE TO RELATED APPLICATION

This application is a Continuation of U.S. application Ser. No. 17/156,738, filed on Jan. 25, 2021, which is a Divisional of U.S. application Ser. No. 15/862,296 (now U.S. Pat. No. 10,902,168), filed on Jan. 4, 2018, which claims priority to Korean Patent Application No. 10-2017-0055660, filed on Apr. 28, 2017, in the Korean Intellectual Property Office, the disclosures of each of which being incorporated by reference herein in their entireties.

BACKGROUND

The inventive concept relates to an integrated circuit, and more particularly, to a computer-implemented method and a computing system for designing an integrated circuit by considering a timing delay.

An integrated circuit may be designed based on standard cells. Specifically, a layout of an integrated circuit may be generated by placing standard cells defining the integrated circuit and routing the placed standard cells. The routing data is then used to fabricate the integrated circuit.

SUMMARY

According to an aspect of an exemplary embodiment, there is provided a method comprising generating, from placing and routing data using at least one processor, wire data corresponding to a net included in an integrated circuit, the wire data comprising metal layer information of a wire corresponding to the net and physical information of the wire; performing, using the at least one processor, timing analysis using the physical information of the wire included in the wire data to generate timing analysis data; and changing a layout of the integrated circuit according to the timing analysis data.

According to another aspect of an exemplary embodiment, there is provided a method comprising performing, using at least one processor, a synthesis operation to generate a netlist from input data about an integrated circuit; placing and routing, using the at least one processor, standard cells defining the integrated circuit using the netlist, to generate layout data and wire data; extracting, using the at least one processor, parasitic components from the layout data; and performing, using the at least one processor, timing analysis of the integrated circuit according to timing constraints, based on the layout data and the wire data.

According to another aspect of an exemplary embodiment, there is provided a method comprising generating, from placing and routing data using at least one processor, wire data comprising one or more nets included in an integrated circuit, and for each net, one or more metal layers forming a wire corresponding to the net and a wire length of the wire on each of the one or more metal layers; performing, using the at least one processor, timing analysis of each of the one or more nets, based on a process variation of the one or more metal layers included in the net, to generate timing analysis data; and changing a layout of the integrated circuit according to the timing analysis data.

According to another aspect of an exemplary embodiment, there is provided a method comprising generating, using at least one processor, wire data from placing and routing data of standard cells defining an integrated circuit, the wire data comprising layer information of at least one wire corresponding to a net included in the integrated circuit and physical information of the at least one wire; generating, using the at least one processor, timing analysis data by performing a timing analysis of a timing path including the net, based on the wire data, wherein the physical information includes a process variation of the at least one wire.

According to another aspect of an exemplary embodiment, there is provided a method comprising generating, using at least one processor, wire data from placing and routing data of standard cells defining an integrated circuit, the wire data comprising layer information of at least one wire corresponding to a net included in the integrated circuit and physical information of the at least one wire; extracting, using the at least one processor, parasitic components from the placing and routing data; generating, using the at least one processor, timing analysis data by performing a timing analysis using the physical information of the wire included in the wire data and the parasitic components that are extracted, wherein the physical information includes a process variation of the at least one wire.

According to another aspect of an exemplary embodiment, there is provided a system for designing an integrated circuit, the system comprising at least one microprocessor and a memory storing code that is executed by the at least one processor to implement a plurality of modules comprising a first module that generates wire data from placing and routing data of standard cells defining an integrated circuit, the wire data comprising layer information of at least one wire corresponding to a net included in the integrated circuit and physical information of the at least one wire; and a timing analysis module that performs timing analysis of a timing path including the net, based on the wire data, to generate timing analysis data, wherein the physical information includes a process variation of the at least one wire.

According to another aspect of an exemplary embodiment, there is provided a system for designing an integrated circuit, the system comprising at least one microprocessor and a memory storing code that is executed by the at least one processor to implement a plurality of modules comprising a placing and routing module that generates wire data from placing and routing data of standard cells defining an integrated circuit, the wire data comprising layer information of at least one wire corresponding to a net included in the integrated circuit and physical information of the at least one wire; a parasitic extraction module that extracts parasitic components from the placing and routing data; and a timing analysis module that performs timing analysis using the physical information of the wire included in the wire data and the parasitic components that are extracted, to generate timing analysis data, wherein the physical information includes a process variation of the at least one wire.

BRIEF DESCRIPTION OF THE DRAWINGS

Exemplary embodiments will be more clearly understood from the following detailed description taken in conjunction with the accompanying drawings in which:

FIG. 7 illustrates wire data generated by the integrated circuit design system of FIG. 6 according to an exemplary embodiment;

FIG. 16 illustrates wire data of the integrated circuit of FIG. 15;

FIGS. 17A to 17C illustrate timing analysis results about the integrated circuit of FIG. 15 according to an exemplary embodiment;

DETAILED DESCRIPTION

As a semiconductor device is miniaturized, the size of patterns included in a layout may decrease gradually, and accordingly, a minute difference between the size of a designed pattern and the size of a pattern implemented by hardware may cause a yield degradation of an integrated circuit. Particularly, due to a process variation of one or more metal layers corresponding to a back-end-of-line (BEOL), a delay through a timing path including wires implemented by the one or more metal layers may increase, and thus, a timing constraint violation may occur in the timing path.

Hereinafter, exemplary embodiments will be described in detail with reference to the accompanying drawings.

Figure 1:
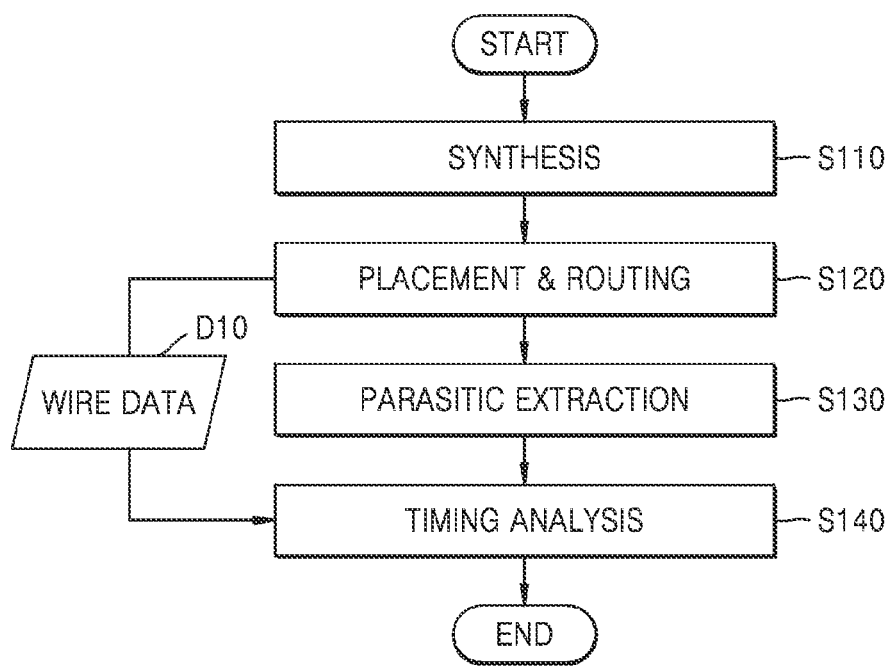
FIG. 1 is a flow diagram illustrating an integrated circuit design method according to an exemplary embodiment.

FIG. 1 is a flow diagram illustrating an integrated circuit design method according to an exemplary embodiment.

Referring to FIG. 1, as an operation of designing a layout of an integrated circuit, the integrated circuit design method may be performed using a tool for designing the integrated circuit. In this case, the tool for designing the integrated circuit may be a program including a plurality of instructions performed by a processor. The processor may be a microprocessor or a central processing unit (CPU) and, one or more processors may be used. Accordingly, the integrated circuit design method may be referred to as a computer-implemented method for designing an integrated circuit.

In operation S110, a synthesis operation is performed. The synthesis operation processes an abstract form of a circuit into a hardware implementation. For example, operation S110 may be performed by the processor by using a synthesis tool. The synthesis tool may generate a netlist by converting input data about an integrated circuit into a hardware type including logic gates. Thus, "synthesis" may be referred to as "logic synthesis". The "input data" may be an abstract form describing behavior of an integrated circuit, for example, data defined in register transfer level (RTL) code. The "netlist" may be generated from the RTL code by using a standard cell library, and may be a netlist of a gate level. In some exemplary embodiments, the RTL code may be provided as an input file to the synthesis tool, and the netlist may be output as an output file from the synthesis tool.

In operation S120, placement and routing may be performed. That is, standard cells defining the integrated circuit are placed and routed (placement & routing (P&R)). For example, operation S120 may be performed by the processor by using an enhanced P&R (P&R) tool. Specifically, layout data about the integrated circuit may be generated by placing the standard cells defining the integrated circuit according to the netlist and routing nets included in the placed standard cells. For example, the layout data may be data of a graphic design system (GDS) II format. In some exemplary embodiments, the netlist may be provided as an input file to the EP&R tool, and the layout data may be output as an output file from the P&R tool.

According to some exemplary embodiments, in operation S120, wire data D10 including layer information of a wire corresponding to a net included in a layout of the integrated circuit and physical information of the wire may be further generated. Herein, "net" may represent an equipotential in an equivalent circuit diagram of the integrated circuit, and may correspond to an interconnection in the layout of the integrated circuit. The layer information may represent one or more layers of a wire pattern used to implement the net, that is, a level of a back-end-of-line (BEOL). The physical information may represent a layout size (e.g., a line length, line width, line area, etc.) of a wire pattern used to implement the net, that is, a layout size of the BEOL. In this case, the output file of the P&R tool may be the layout data and the wire data D10. In other words, the layout data and the wire data D10 may be output as separate output files from the P&R tool. However, the inventive concept is not limited thereto, and according to some exemplary embodiments, in operation S120, layout data about the integrated circuit may include wire data. In this case, the output file of the P&R tool may be the layout data.

As discussed above, the concept of "net" may represent an equipotential in an equivalent circuit diagram of the integrated circuit, and may correspond to an interconnection in the layout of the integrated circuit. The interconnection may correspond to a wiring structure including at least one via and at least one metal layer that are electrically connected to each other. In conventional layout methods, wire data is produced for each metal layer. However, there is no concept of how the wires are interconnected together to from various nets in the layout. Thus, as used herein, the "wire corresponding to the net" may include a plurality of vias and a plurality of metal layers that are actually used to implement the net. In other words, for example, the wire corresponding to the net may include a wire proceeding from one logic gate on a first layer, running in the first layer and then proceeding through a via to a second layer, running in the second layer and then through another via back to the first layer to connect to another logic gate on the first layer. (See another example in FIGS. 3A and 3B described later). It should be noted that in some instances the net may include a wire running on a single metal layer to connect logic components. In such a case, the net may be considered as synonymous with a wire. Herein, "wire" may correspond to a BEOL, and will be used as a concept including a metal layer and a via. Thus, the wire data D10 may be metal layer data and may be via data.

In some exemplary embodiments, the wire data D10 may include layer information of a metal layer corresponding to a net included in the layout of the integrated circuit and physical information of the metal layer. For example, the physical information of the metal layer may include length information, width information, space information, or shielding information of the metal layer. The length information of the metal layer may be a first-direction size of a metal layer pattern used to implement the net. The width information of the metal layer may be a second-direction size of the metal layer pattern used to implement the net, and the first direction and second direction may be perpendicular to each other. The space information of the metal layer may be a distance between adjacent metal layer patterns of the same layer as the metal layer pattern used to implement the net. The shielding information of the metal layer may represent whether there is a shielding pattern adjacent to the metal layer pattern used to implement the net. For example, as an adjacent metal layer pattern of the same layer as the metal layer, the shielding pattern may be a pattern to which a first voltage (e.g., a ground voltage) is applied.

In some exemplary embodiments, the wire data D10 may include layer information of a via corresponding to a net included in the layout of the integrated circuit and physical information of the via. For example, the physical information of the via may include a type of the via or the number of vias. The type of the via may be various types such as a double via, a single via, or a bar via used in a process. The number of vias may represent the number of vias placed in different metal layers. As another example, the physical information of the via may include length information, circumference information, or width information of the via.

In operation S130, parasitic components are extracted. The parasitic components may be extracted from the layout data. For example, operation S130 may be performed by the processor by using an enhanced parasitic extraction (PEX) tool. Specifically, parasitic components such as a parasitic resistance and a parasitic capacitance of the net included in the layout data may be extracted, and an enhanced standard parasitic extraction format (SPEF) file may be generated. The enhanced standard parasitic extraction format file may be a modified form of a standard parasitic extraction format (SPEF) file. For example, the SPEF file may include the resistance and capacitance of each of a plurality of metal layers used in the net. For example, the SPEF file may include the resistance and capacitance of each of a plurality of vias used in the net. In other words, as an example, the parasitic resistance and the parasitic capacitance of the net may include a parasitic resistance and a parasitic capacitance of each of a wire running in a first layer, a via from a first layer to a second layer, a wire running in a second layer, and a via from the second layer back to the first layer. According to the present exemplary embodiment, the layout data may be provided as an input file to the PEX tool, and the SPEF file may be output as an output file from the P&R tool.

In operation S140, a timing analysis is performed. The timing analysis of the integrated circuit may be performed. For example, operation S140 may be performed by the processor by using an enhanced static timing analysis (STA) tool. The "timing analysis" represents an operation of determining whether timing paths included in the layout of the integrated circuit satisfy timing constraints, and selecting a timing critical path of the integrated circuit. For example, the timing critical path may be a timing path in which a total timing delay from an input (i.e., a start point) to an output (i.e., an end point) exceeds timing requirements among the timing paths according to the determination result. The timing constraints may include setup timing constraints and hold timing constraints.

According to the present exemplary embodiment, in operation S140, timing analysis data reflecting process variations of the wire may be generated by performing a timing analysis based on the wire data with respect to the timing paths included in the layout data. According to some exemplary embodiments, the layout data including the wire data may be provided as an input file to the STA tool, and the timing analysis data may be output as an output file from the STA tool. Alternatively, in other exemplary embodiments, each of the layout data and the wire data (as separate files) may be provided as input to the STA tool, and the timing analysis data may be output as an output file from the STA tool.

In some exemplary embodiments, the design method may further include an operation of performing engineering change orders (ECO) according to the timing analysis data. In some exemplary embodiments, the design method may further include an operation of performing clock tree synthesis (CTS) by using timing analysis data. In some exemplary embodiments, the design method may further include an operation of performing optimization in a P&R operation by using the timing analysis data. In some exemplary embodiments, the design method may further include an operation of modifying metal routing included in the P&R operation by using the timing analysis data. For example, based on the timing analysis data, the length of one or more wires may be modified and/or the metal layer of a wire may be modified into a wire of another metal layer, in order to improve the timing of the net to which the wire corresponds.

Figure 2:
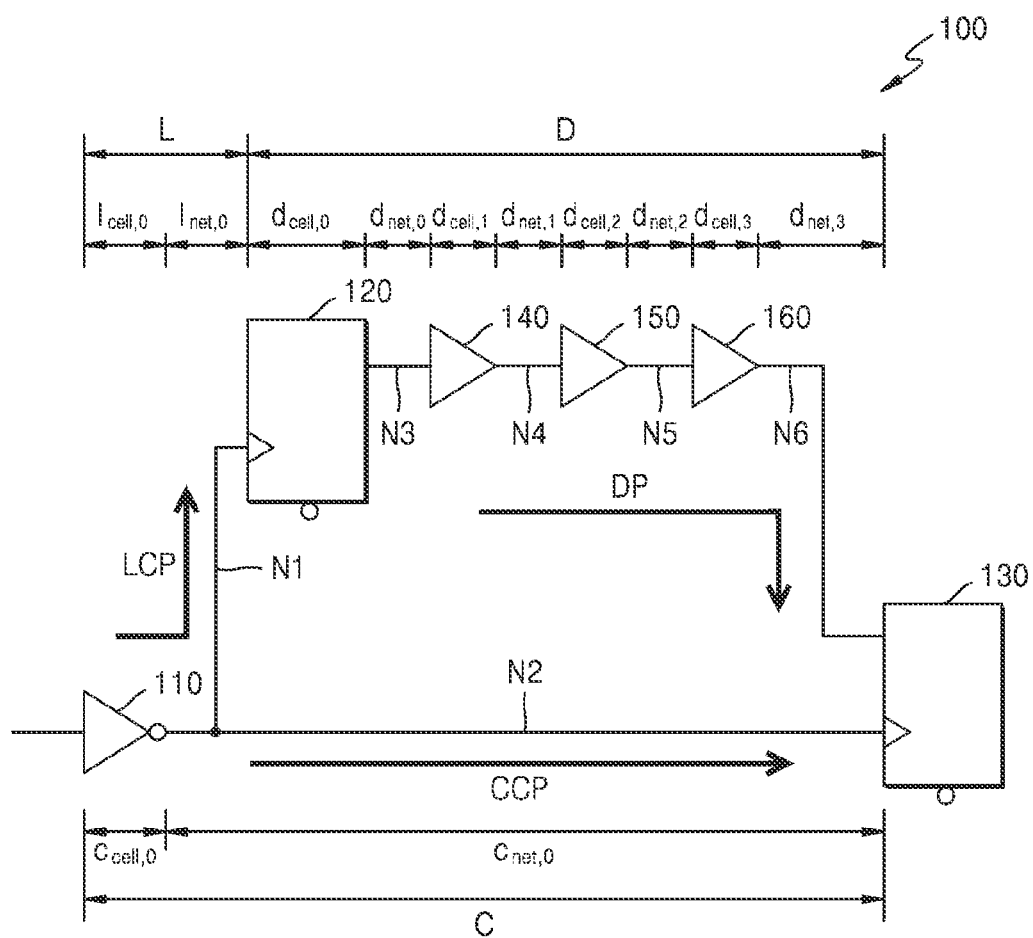
FIG. 2 illustrates an integrated circuit according to an exemplary embodiment.

FIG. 2 illustrates an integrated circuit 100 according to an exemplary embodiment.

Referring to FIG. 2, the integrated circuit 100 may include a first cell 110, a second cell 120, a third cell 130, a fourth cell 140, a fifth cell 150, and a sixth cell 160. For example, the second cell 120 may correspond to a launch flip-flop, and the third cell 130 may correspond to a capture flip-flop. For example, in operation S140 of FIG. 1, a timing analysis may be performed on timing paths included in the integrated circuit 100. An operation speed of the integrated circuit 100 may be determined according to a delay through a timing path. A setup timing path or a hold timing path includes a data path DP, a launch clock path LCP, and a capture clock path CCP, as shown in FIG. 2.

The data path DP may be defined as a timing path from a clock pin of the second cell 120 corresponding to the launch flip-flop to a data input pin of the third cell 130 corresponding to the capture flip-flop. A delay D through the data path DP may be represented as Equation 1 below.

$$D = D_{cell} + D_{net} = \sum_{i=0}^{n-1} d_{cell,i} + \sum_{i=0}^{n-1} d_{net,i} \qquad \text{Equation 1}$$

Herein, "n" denotes the number of cells included in the data path DP. For example, the data path DP may include the second cell 120, the fourth cell 140, the fifth cell 150, and the sixth cell 160, and thus in this case, "n" is 4. "$D_{cell}$" denotes a total cell delay of the data path DP, and may correspond, for example, to the sum of a delay $d_{cell,0}$ of the second cell 120, a delay $d_{cell,1}$ of the fourth cell 140, a delay $d_{cell,2}$ of the fifth cell 150, and a delay $d_{cell,3}$ of the sixth cell 160. "$D_{net}$" denotes a total net delay of the data path DP, and may correspond, for example, to the sum of a delay $d_{net,0}$ of a net N3 connecting the second cell 120 and the fourth cell 140, a delay $d_{net,1}$ of a net N4 connecting the fourth cell 140 and the fifth cell 150, a delay $d_{net,2}$ of a net N5 connecting the fifth cell 150 and the sixth cell 160, and a delay $d_{net,3}$ of a net N6 connecting the sixth cell 160 and the third cell 130. In general, since the data path DP includes a relatively large number of cells, the data path DP may be less sensitive to a total net delay (i.e., a wire delay) than the launch clock path LCP and the capture clock path CCP.

The launch clock path LCP may be defined as a timing path from a common clock pin of the clock tree to a clock input pin of the second cell 120 corresponding to the launch flip-flop. A delay L through the launch clock path LCP may be represented as Equation 2 below.

$$L = L_{cell} + L_{net} = \sum_{i=0}^{j-1} l_{cell,i} + \sum_{i=0}^{j-1} l_{net,i} \qquad \text{Equation 2}$$

Herein, "j" denotes the number of cells included in the launch clock path LCP. For example, the launch clock path LCP may include the first cell 110, and thus in this case, "j" is 1. "$L_{cell}$" denotes a total cell delay of the launch clock path LCP, and may correspond, for example, to a delay $l_{cell,0}$ of the first cell 110. "$L_{net}$" denotes a total net delay of the launch clock path LCP, and may correspond, for example, to a delay $l_{net,0}$ of a net N1 connecting the first cell 110 and the second cell 120. In general, since the launch clock path LCP includes a relatively small number of cells, the launch clock path LCP may be more sensitive to a total net delay (i.e., a wire delay) than the data path DP.

The capture clock path CCP may be defined as a timing path from a common clock pin of the clock tree to a clock input pin of the third cell 130 corresponding to the capture flip-flop. A delay C through the capture clock path CCP may be represented as Equation 3 below.

$$C = C_{cell} + C_{net} = \sum_{i=0}^{k-1} c_{cell,i} + \sum_{i=0}^{k-1} c_{net,i} \qquad \text{Equation 3}$$

Herein, "k" denotes the number of cells included in the capture clock path CCP. For example, the capture clock path CCP may include the first cell 110, and thus in this case, "k" is 1. "Cees" denotes a total cell delay of the capture clock path CCP, and may correspond, for example, to a delay $c_{cell,0}$ of the first cell 110. "$c_{net}$" denotes a total net delay of the capture clock path CCP, and may correspond, for example, to a delay $c_{net,0}$ of a net N2 connecting the first cell 110 and the third cell 130. In general, since the capture clock path CCP includes a relatively small number of cells, the capture clock path CCP may be more sensitive to a total net delay (i.e., a wire delay) than the data path DP.

By using Equations 1 to 3, a hold time slack $T_{HOLD}$ may be represented as Equation 4 below.

$$T_{HOLD}=L+D-C+\alpha=(L_{cell}+L_{wire})+(D_{cell}+D_{wire})-(C_{cell}+C_{wire})\alpha=(L_{cell}+D_{cell}-C_{cell})+(L_{wire}+D_{wire}-C_{wire})+\alpha=S_{cell}+S_{wire}+\alpha \qquad \text{Equation 4}$$

Herein, "a" is a constant and denotes the sum of other timing parameters such as a clock uncertainty and a flip-flop hold margin. Herein, "$S_{cell}$" denotes a hold slack difference due to a cell delay, and "$S_{wire}$" denotes a hold slack difference due to a wire delay. In Equation 4, "$L_{wire}$", "$D_{wire}$", and "$C_{wire}$" may correspond respectively to "$L_{net}$" of Equation 2, "$D_{net}$" of Equation 1, and "$C_{net}$" of Equation 3.

For example, in a case in which the integrated circuit of FIG. 2 is implemented using only a metal layer D1, when the resistance of the metal layer D1 used to implement the integrated circuit 100 is manufactured to be greater by 20% than a target value of a model, the constant "α" and the hold slack difference "$S_{cell}$" due to a cell delay are not changed and only the hold slack difference "$S_{wire}$" due to a wire delay is changed in Equation 4. In this case, a hold time slack difference $\Delta T_{HOLD}$ may be represented as Equation 5 below.

$$\Delta T_{HOLD}=T_{HOLD,D1@20\%}-T_{HOLD}=(S_{cell}+S_{wireD1@20\%}+\alpha)-(S_{cell}+S_{wire}+\alpha)=S_{wireD1@20\%}-S_{wire}=\Delta S_{wire} \qquad \text{Equation 5}$$

The hold slack difference "$S_{wire}$" due to a wire delay is used to analyze a wire model-to-hardware correlation (MHC) issue. "MHC" represents the consistency between a model on which a design is based and hardware that is actually implemented in silicon. When the model has electrical characteristics that are different from those measured in silicon, the chip performance expected in a design stage may not be realized.

In particular, "wire MHC mismatch" may represent a difference between the modeled resistance/capacitance value of a wire and the resistance/capacitance value of a wire that is actually implemented. For example, a wire MHC mismatch may be caused by process variations of the BEOL, such as metal layer resistance variations, metal layer capacitance variations, or via variations. For example, when an actual resistance of a metal layer is greater than a modeled target resistance, a delay through a timing path including the metal layer may increase, and accordingly, a hold violation may occur as a result of a timing analysis on the timing path.

According to a conventional design method, in a timing analysis stage, physical information about a net included in a timing path may not be known. That is, in the timing analysis stage, it may not be known by which metal layer or layers the net is actually implemented. Accordingly, timing analysis data reflecting the process variations of wires may not be generated in the timing analysis stage. However, according to exemplary embodiments, in an operation of generating layout data or an operation of extracting parasitic components, the accuracy of a timing analysis may be improved by generating wire data including layer information of a wire corresponding to a net included in a layout of an integrated circuit and physical information about the wire, and performing a timing analysis by using the generated wire data. Thus, improved mass production may be secured by finding and addressing design vulnerabilities. A timing analysis operation will be described in detail with reference to FIGS. 6 to 12.

Figure 3A:
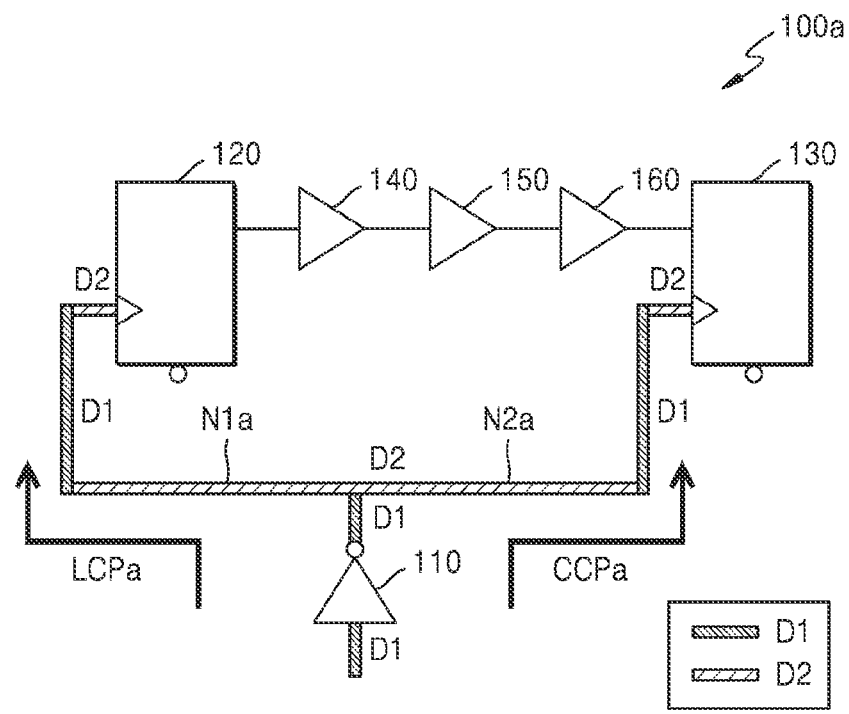
FIGS. 3A and 3B illustrate implementation examples of a clock tree included in the integrated circuit of FIG. 2.
Figure 3B:
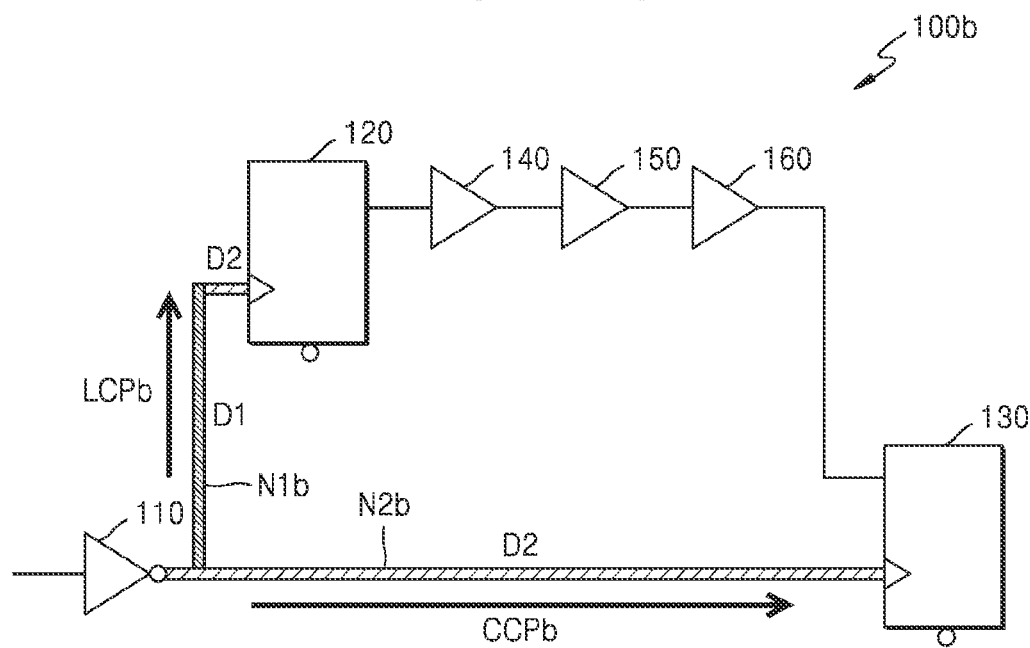

FIGS. 3A and 3B illustrate implementation examples (100a and 100b) of the clock tree included in the integrated circuit of FIG. 2.

Referring to FIG. 3A, an integrated circuit 100a is an implementation example having a robust clock tree. A net N1a included in a launch clock path LCPa may be implemented by a first metal layer D1 and a second metal layer D2, and a net N2a included in a capture clock path CCPa may also be implemented by the first metal layer D1 and the second metal layer D2. For example, a variation may occur only in the first metal layer D1 among the first and second metal layers D1 and D2 and thus the resistance of the first metal layer D1 may increase in comparison with a target value. In this case, since both a wire delay through the launch clock path LCPa and a wire delay through the capture clock path CCPa increase simultaneously in Equation 4, a hold time slack difference between LCPa and CCPa is 0 in Equation 5 and a hold violation may not occur. In other words, since the launch clock path LCPa and the capture clock path CCPa include similar wires on similar layers, the hold time slack difference does not occur.

Referring to FIG. 3B, an integrated circuit 100b is an implementation example having a clock tree vulnerable to process variations of wires. A net N1b included in a launch clock path LCPb may be implemented by a first metal layer D1 and a second metal layer D2, and a net N2b included in a capture clock path CCPb may be implemented by a second metal layer D2. For example, a variation may occur only in the first metal layer D1 among the first and second metal layers D1 and D2 and thus the resistance of the first metal layer D1 may increase in comparison with a target value. In this case, since a wire delay through the launch clock path LCPb increases and a wire delay through the capture clock path CCPb does not increase, a hold time slack difference may have a value greater than 0 in Equation 5 and a hold violation may occur.

In this manner, when the clock tree does not have a robust structure, a hold violation may occur due to a wire model-to-hardware correlation (MHC) mismatch such as a resistance variation and/or a capacitance variation of a metal layer (e.g., D1 gets faster, or D2 gets slower) corresponding to a wire, a metal, and/or a via variation corresponding to a net. Thus, the inventive concept proposes a new timing analysis method that analyzes a metal routing structure to remove a timing violation caused by a wire MHC and predicts time slacks by using a wire RC variation specification.

Figure 4:
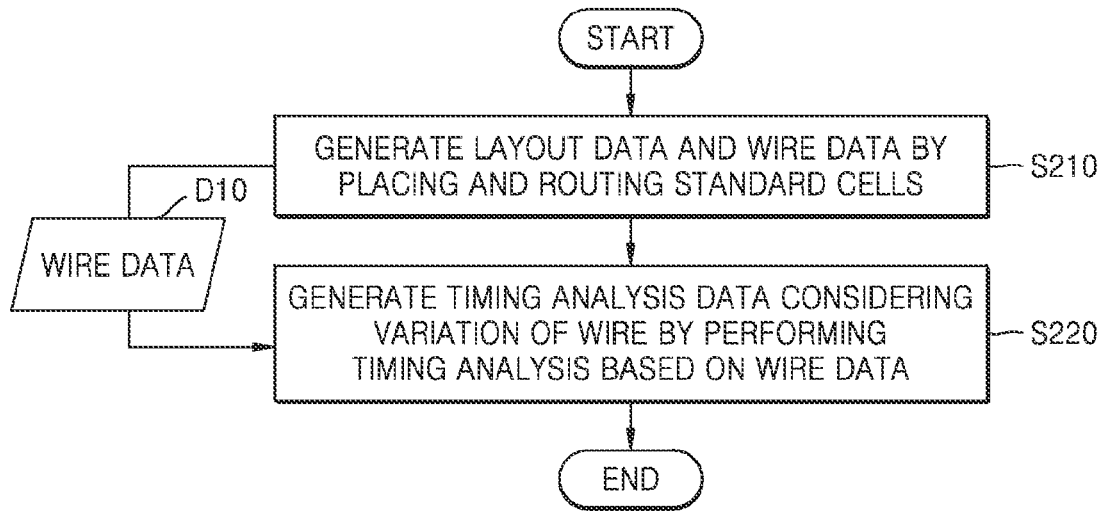
FIG. 4 is a flow diagram illustrating an integrated circuit design method according to an exemplary embodiment.

FIG. 4 is a flow diagram illustrating an integrated circuit design method according to an exemplary embodiment.

Referring to FIG. 4, the integrated circuit design method according to the exemplary embodiment may correspond to an implementation example of FIG. 1 as a method of performing a timing analysis of an integrated circuit in consideration of wire variations. In operation S210, layout data and wire data are generated by placing and routing standard cells. For example, layout data of the integrated circuit and wire data D10 corresponding to a net included in the layout data of the integrated circuit are generated by placing and routing standard cells defining the integrated circuit. The wire data D10 may include layer information of at least one wire corresponding to a net included in the integrated circuit and physical information of the at least one wire. For example, the wire data D10 may include length information of a wire. According to some exemplary embodiments, an operation of extracting parasitic components from the layout data may be further included between operation S210 and operation S220. For example, the operation of extracting the parasitic components may correspond to operation S130 of FIG. 1.

In operation S220, timing analysis data is generated considering variation of a wire by performing timing analysis based on the wire data. For example, timing analysis data reflecting process variations of the at least one wire is generated by performing a timing analysis based on the wire data D10 with respect to a timing path including the net. In some exemplary embodiments, a timing analysis may be performed on the timing path based on unit delay information representing a delay per unit length of at least one wire and physical information of at least one wire. In some exemplary embodiments, a wire delay skew of the timing path may be calculated based on a time constant scaling factor based on the process variations of at least one wire, unit delay information representing a delay per unit length of at least one wire, and physical information of at least one wire. This timing analysis will be described in more detail with reference to FIGS. 9 to 12. In some exemplary embodiments, the design method may further include an operation of performing an engineering change order (ECO) according to the timing analysis data.

Figure 5:
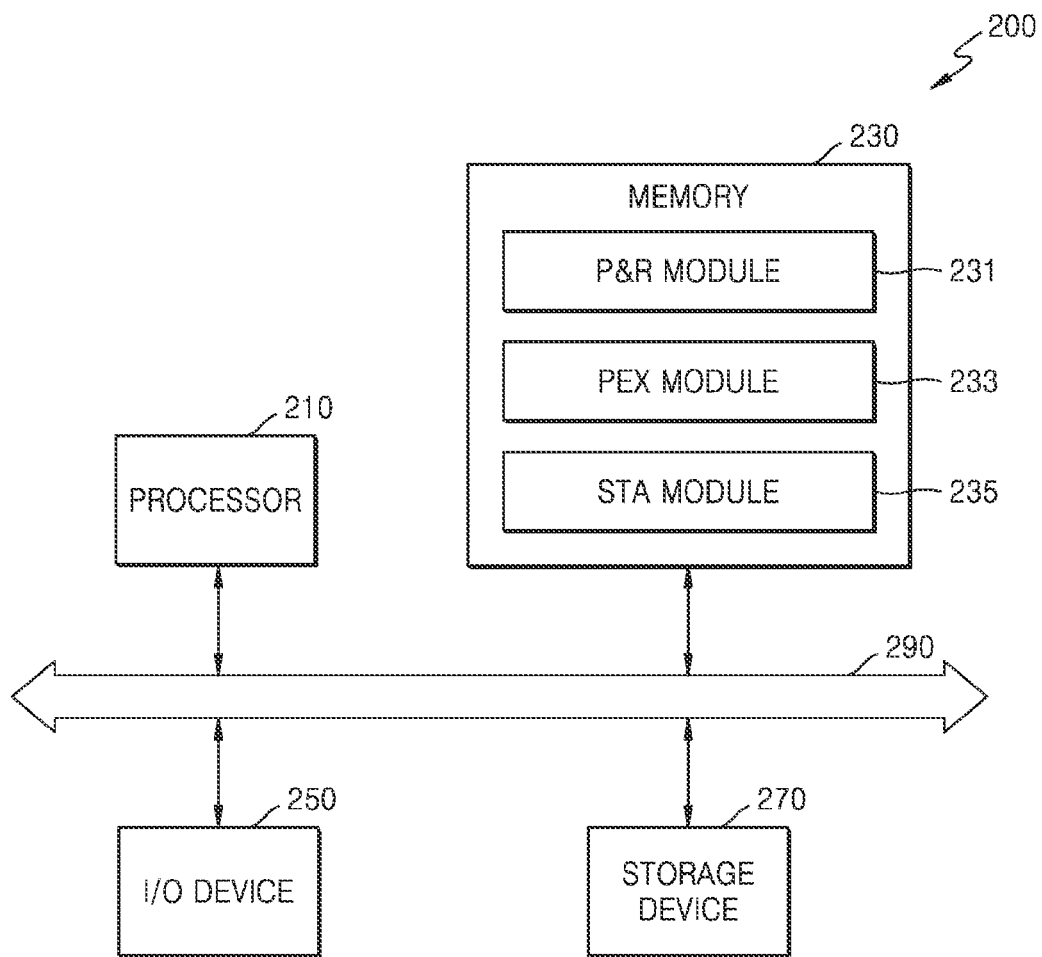
FIG. 5 is a block diagram illustrating an integrated circuit design system for designing an integrated circuit according to an exemplary embodiment.

FIG. 5 is a block diagram illustrating an integrated circuit design system 200 for designing an integrated circuit according to an exemplary embodiment.

Referring to FIG. 5, the integrated circuit design system 200 may be a computing system for designing an integrated circuit. The integrated circuit design system may include a processor 210, a memory 230, an input/output (I/O) device 250, a storage device 270, and a bus 290. The integrated circuit design system 200 may perform an integrated circuit design operation including operations S110 to S140 of FIG. 1 or operations S210 and S220 of FIG. 4. In the exemplary embodiment shown in FIG. 4, the integrated circuit design system 200 may be implemented as an integrated device, and accordingly, integrated circuit design system 200 may also be referred to as an integrated circuit design apparatus. The integrated circuit design system 200 may be provided as a dedicated apparatus for designing an integrated circuit of a semiconductor device, or may be a computer for driving various simulation tools or design tools.

The processor 210 may include one or more microprocessors and may be configured to execute instructions for performing at least one of various operations for designing an integrated circuit. The processor 210 may communicate with the memory 230, the I/O device 250, and the storage device 270 through the bus 290. The processor 210 may execute an integrated circuit design operation by driving a P&R module 231, a PEX module 233, and an STA module 235 loaded in the memory 230.

The memory 230 may store the P&R module 231, the PEX module 233, and the STA module 235. Also, the memory 230 may further store a synthesis module. The P&R module 231, the PEX module 233, and the STA module 235 may be loaded from the storage device 270 into the memory 230. The memory 230 may include, for example, a volatile memory such as Static Random Access Memory (SRAM) or Dynamic Random Access Memory (DRAM), or a nonvolatile memory such as PRAM, MRAM, ReRAM, FRAM, or NOR flash memory.

The P&R module 231 may be, for example, a program including a plurality of instructions for performing an enhanced P&R operation according to operation S120 of FIG. 1 or operation S210 of FIG. 4. The PEX module 233 may be, for example, a program including a plurality of instructions for performing an enhanced parasitic extraction operation according to operation S130 of FIG. 1. The STA module 235 may be, for example, a program including a plurality of instructions for performing an enhanced timing analysis operation according to operation S140 of FIG. 1 or operation S220 of FIG. 4. It is noted that the P&R module 231, the PEX module 233 and the STA module 235 are shown as separate components in FIG. 5. However, this is only an example, and the P&R module 231, the PEX module 233 and the STA module 235 may be combined together into one module or into two modules. In other words, the modules do not need to be provided as separate modules.

The I/O device 250 may control a user input and output from one or more user interface devices. For example, the I/O device 250 may include an input device such as a keyboard, a mouse, and/or a touch pad to receive input data defining an integrated circuit. In some exemplary embodiments, the I/O device 250 may receive various user inputs such as a metal RC variation scaling factor. For example, the I/O device 250 may include a display device such as a display and/or a speaker to display placement results, routing results, and/or timing analysis results. In some exemplary embodiments, with respect to a wire corresponding to a net included in an integrated circuit, the I/O device 250 may display a first wire delay based on a target value, a second wire delay based on a process variation, and a wire delay skew generated from the first wire delay and the second wire delay.

The storage device 270 may store various data related to the P&R module 231, the PEX module 233, and the STA module 235. The storage device 270 may include, for example, a memory card (e.g., MMC, eMMC, SD, or MicroSD), a solid state drive, and/or a hard disk drive.

Figure 6:
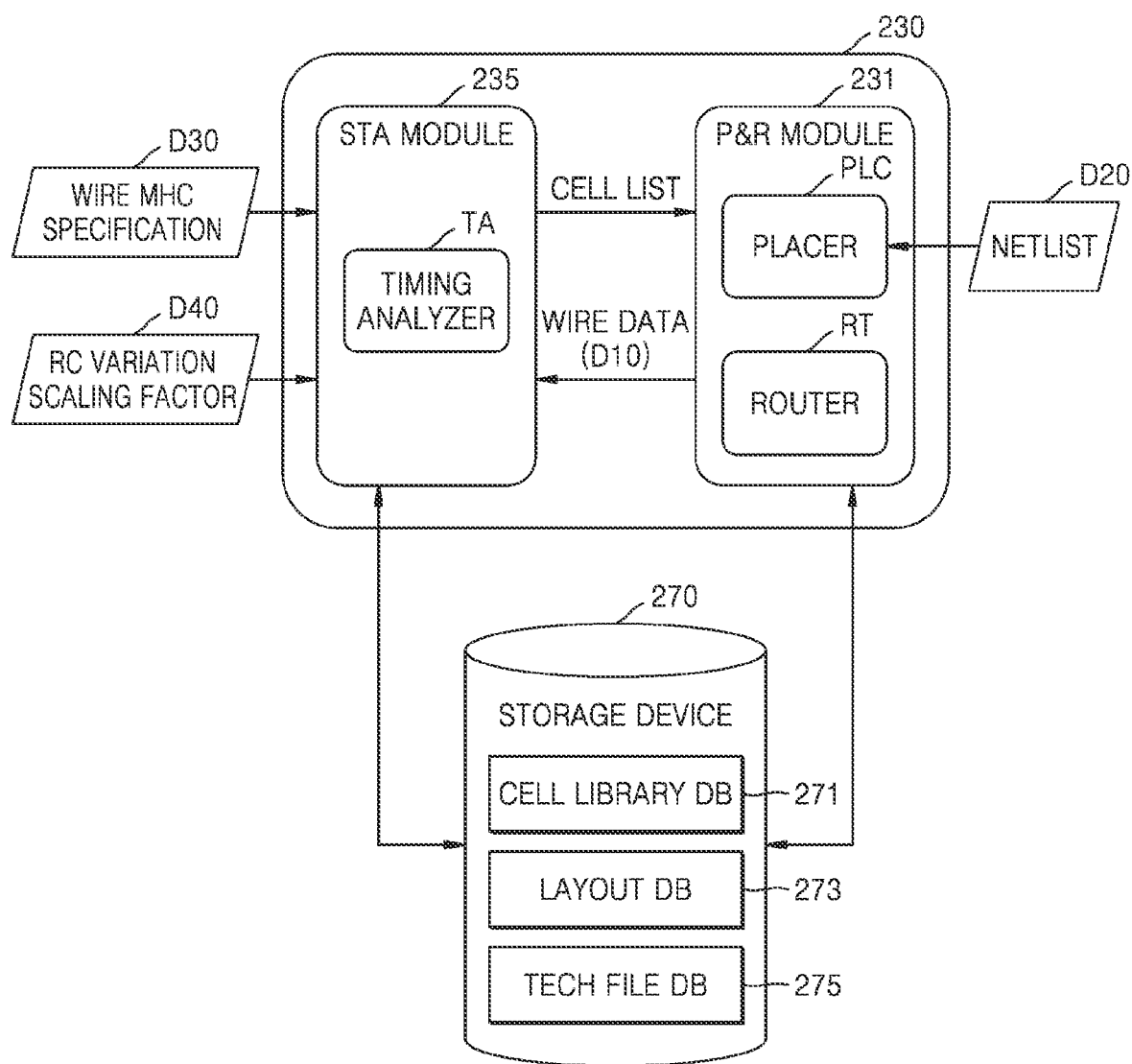
FIG. 6 is a block diagram illustrating the integrated circuit design system of FIG. 5 in more detail.

FIG. 6 is a block diagram illustrating the integrated circuit design system of FIG. 5 in more detail.

Referring to FIGS. 5 and 6, the program stored in the memory 230 may include a plurality of procedures, and a procedure may designate a series of instructions for performing a particular task. The procedure may also be referred to as a function, a routine, a subroutine, or a subprogram. According to the exemplary embodiment shown in FIG. 6, the procedures may include a placer PLC, a router RT, and a timing analyzer TA. Specifically, the P&R module 231 may include the placer PLC and the router RT, and the STA module 235 may include the timing analyzer TA. Also, the procedures may further include a parasitic extractor, and the parasitic extractor may be included, for example, in the PEX module 233. Herein, performing an operation by executing a procedure (PLC, RT, or TA) by the processor 210 of FIG. 5 may be represented as performing the operation by the procedure (PLC, RT, or TA).

The storage device 270 may include a cell library database (DB) 271, a layout DB 273, and a technology (tech) file DB 275. The cell library DB 271 may store information about a standard cell for generating a layout of an integrated circuit, and may be referred to as a standard cell library DB. The layout DB 273 may store information about a layout generated in procedures, for example, physical information about the layout. The technology file DB 275 may store a technology file for storing materials and rules used in an integrated circuit manufacturing process. The technology (tech) file DB 275 may store, for example, layer definitions, device definitions, and/or design tools. In the exemplary embodiment shown in FIG. 6, the technology (tech) file DB 275 may store unit delays corresponding respectively to a plurality of metal layers.

The placer PLC may place standard cells according to a netlist D20, and specifically, the placer PLC may perform a placement operation by accessing the cell library DB 271 of the storage device 270. The router RT may generate layout data by routing the standard cells placed by the placer PLC. The generated layout data may be stored in the layout DB 273 of the storage device 270. Also, the router RT may generate wire data D10 including layer information of at least one wire corresponding to each of a plurality of nets included in an integrated circuit and physical information of at least one wire. Hereinafter, the wire data D10 will be described in more detail with reference to FIGS. 7 and 8.

FIG. 7 illustrates the wire data D10 of FIG. 6 according to an exemplary embodiment.

Referring to FIG. 7, the wire data D10 may include, for example, layer information (Ma to Mf) of at least one wire corresponding to each of nets N1 to N7 included in the integrated circuit 100 of, for example, FIG. 2 and length information in the metal layer of the at least one wire. For example, the wire data D10 may be generated in operation S210 of FIG. 4. For example, metal layers corresponding to the net N4 may be second metal layer M2, third metal layer M3, fourth metal layer M4 and fifth metal layer M5, and the lengths of the second to fifth metal layers M2 to M5 used to implement the net N4 may be respectively $\lambda_2$ to $\lambda_5$.

Figure 8:
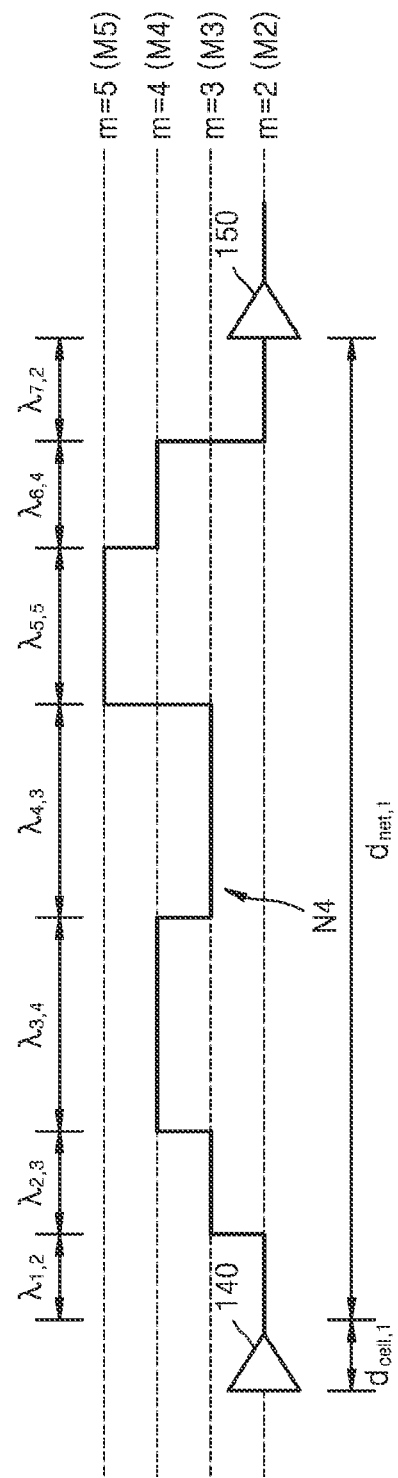
FIG. 8 illustrates metal layers corresponding to a net of the wire data of FIG. 7 according to an exemplary embodiment.

FIG. 8 illustrates metal layers corresponding to the net N4 of FIG. 7 according to an exemplary embodiment.

Referring to FIGS. 7 and 8, the net N4 may be implemented by using the second to fifth metal layers M2 to M5. A total wire length $\lambda_{total}$ corresponding to the net N4 corresponds to the sum of the respective lengths $\lambda_2$ to $\lambda_5$ of the wires of the net implement in the second to fifth metal layers M2 to M5, respectively. Thus, the total wire length $\lambda_{total}$ corresponding to the net N4 shown in FIGS. 7 and 8 may be represented as Equation 6 below.

$$\lambda_{total} = \lambda_2 + \lambda_3 + \lambda_4 + \lambda_5 - (\lambda_{1,2} + \lambda_{7,2}) + (\lambda_{2,3} + \lambda_{4,3}) + (\lambda_{3,4} + \lambda_{6,4}) + \lambda_{5,5} \qquad \text{Equation 6}$$

Herein, $\lambda_{i,m}$ denotes a metal routing length, "i" denotes a metal routing order, and "m" denotes a metal layer number.

Figures 9, 10:
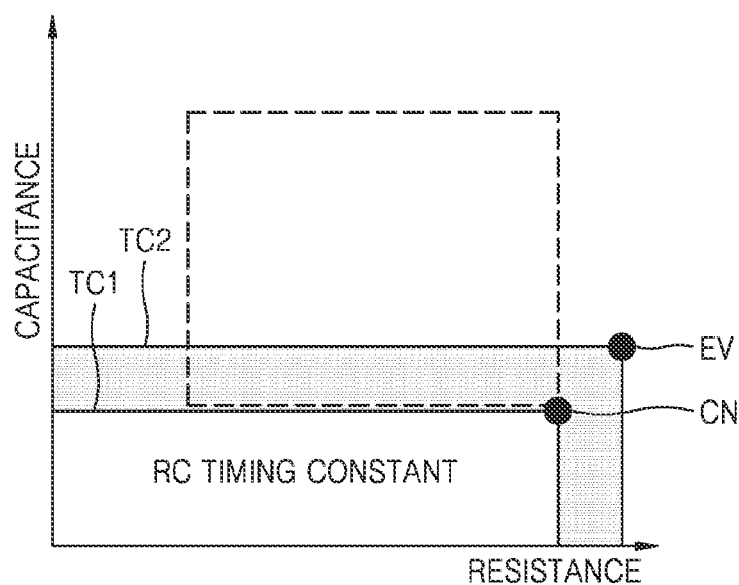
FIG. 9 is a table illustrating parameters for calculating a wire delay skew by a timing analyzer of the integrated circuit design system of FIG. 6 according to an exemplary embodiment.
FIG. 10 is a graph illustrating resistance and capacitance of an m-th metal layer according to an exemplary embodiment.

FIG. 9 is a table illustrating parameters used to calculate a wire delay skew $\Delta_m$ by the timing analyzer TA of FIG. 6 according to an exemplary embodiment.

Referring to FIGS. 6 and 9, the timing analyzer TA may search for a timing critical path by performing a timing analysis on an integrated circuit, generate a cell list about the standard cells included in the timing critical path, and transmit the generated cell list to the P&R module 231. The P&R module 231 may find the nets connected to the standard cells included in the cell list and transmit the wire data D10 about the nets that are found to the STA module 235, that is, the timing analyzer TA. For example, the wire data D10 may include a metal wire length $\lambda_m$ of an m-th metal wire.

Subsequently, the timing analyzer TA may calculate a wire delay skew $\Delta_m$ based on the wire data D10, a wire model-to-hardware correlation (MHC) specification D30, and an resistance-capacitance (RC) variation scaling factor D40. Specifically, the timing analyzer TA may receive the wire MHC specification D30 including a unit delay $\tau_m$ of the m-th metal wire from the technology (tech) file DB 275 included in the storage device 270. For example, the unit delay $\tau_m$ of the m-th metal wire may be generated by a silicon monitoring circuit. Also, the timing analyzer TA may receive a user input including an RC variation scaling factor are $\sigma_m$ of the m-th metal layer (i.e., D40) representing an RC time constant variation of the m-th metal layer from the I/O device 250. The RC variation scaling factor $\sigma_m$ will be described below with reference to FIG. 10.

The timing analyzer TA may calculate a wire delay $\delta_{total}$ of one or more wires in a particular metal layer based on the metal wire length $\lambda_m$ of the one or more wires in the m-th metal layer, the unit delay $\tau_m$ of the m-th metal layer including the one or more wires, and the RC variation scaling factor $\sigma_m$ of the m-th metal layer including the one or more wires. The wire delay $\delta_{total}$ of the one or more wires in a particular metal layer may be included in the timing analysis data output from the timing analyzer TA. The timing analyzer TA may calculate the wire delay skew $\Delta_m$ based on the wire delay $\delta_{total}$. The wire delay skew may be included in the timing analysis data output from the timing analyzer TA.

FIG. 10 is a graph illustrating the resistance and capacitance of an m-th metal layer according to an exemplary embodiment.

Referring to FIG. 10, a horizontal axis represents the resistance of the m-th metal layer, and a vertical axis represents the capacitance of the m-th metal layer. In the graph of FIG. 10, a box represented by a dotted line represents an allowable range of the modeled RC value of the m-th metal layer. The box may be set experimentally based on measured values of resistance and capacitance for the metal layer. An RC time constant may be set to a first time constant TC1 based on a corner value CN of an RC of the m-th metal layer. When the RC of the m-th metal layer has an extra value EV exceeding the allowable range due to the process variation of the m-th metal layer, the RC time constant may be set to a second time constant TC2. In this case, the ratio of the second time constant TC2 to the first time constant TC1 may be defined as the RC variation scaling factor $\sigma_m$.

Figure 11:
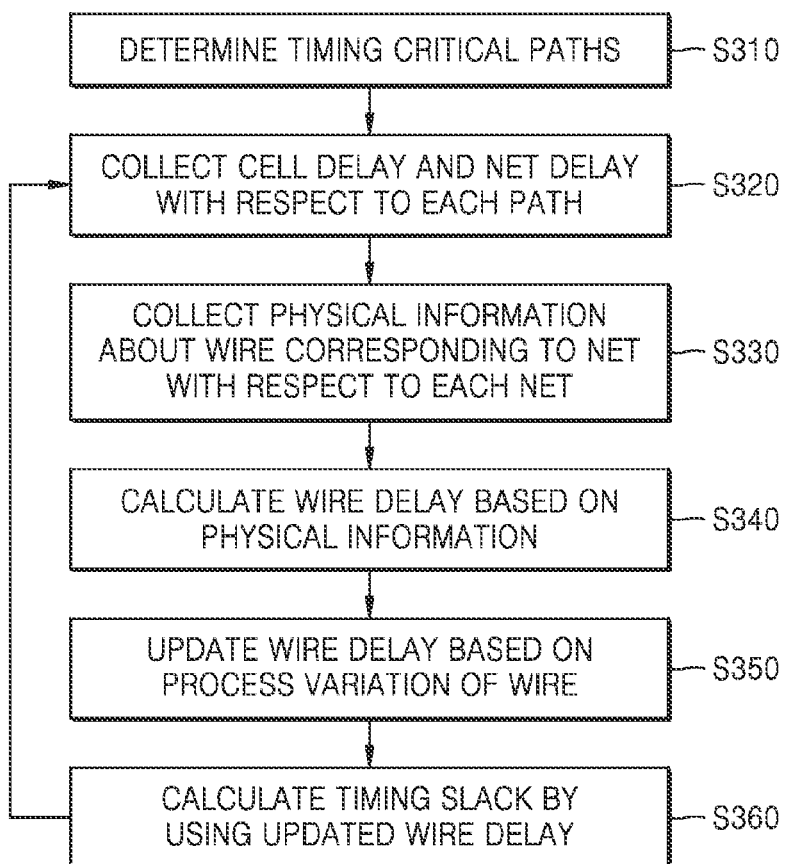
FIG. 11 is a flow diagram illustrating a timing analysis method according to an exemplary embodiment.

FIG. 11 is a flow diagram illustrating a timing analysis method according to an exemplary embodiment.

Referring to FIG. 11, the timing analysis method according to the exemplary embodiment shown in FIG. 11 may correspond to an implementation example of operation S220 of FIG. 4. For example, the timing analysis method according to the exemplary embodiment shown in FIG. 11 may be sequentially performed by the integrated circuit design system 200 of FIG. 5. Hereinafter, the timing analysis method will be described with reference to FIG. 11.

In operation S310, timing critical paths are searched. For example, the STA module 235 may determine timing critical paths by performing a timing analysis on the timing paths included in the integrated circuit. For example a timing critical path may be a path for which a hold violation occurs. See, e.g., FIGS. 3A and 3B and associated discussion above. The STA module 235 may determine the timing critical paths. However, the inventive concept is not limited thereto, and in some exemplary embodiments, operation S310 may be performed by the P&R module 231.

In operation S320, a cell delay and a net delay are collected for each timing critical path that is determined. For example a cell delay and a net delay may be collected with respect to a path selected from among the determined timing critical paths. For example, the STA module 235 may acquire a delay through the selected path by collecting the cell delays of a plurality of cells included in the selected path and the net delays of a plurality of nets included in the selected path. However, the inventive concept is not limited thereto, and in some exemplary embodiments, operation S320 may be performed by the P&R module 231.

For example, referring back to FIG. 2 and its associated description, when the selected path includes a data path, cell delays $d_{cell,0}$ to $d_{cell,n-1}$ of n cells included in the data path and net delays $d_{net,0}$ to $d_{net,n-1}$ of n nets included in the data path may be collected as described in Equation 1 above. When the selected path includes a launch path, cell delays $l_{cell,0}$ to $l_{cell,j-1}$ of j cells included in the launch path and net delays $l_{net,0}$ to $l_{net,j-1}$ of j nets included in the launch path may be collected as described in Equation 2 above. When the selected path includes a capture path, cell delays $c_{cell,0}$ to $c_{cell,k-1}$ of k cells included in the capture path and net delays $c_{net,0}$ to $c_{net,k-1}$ of k nets included in the capture path may be collected as described in Equation 3 above.

In operation S330, physical information about at least one wire corresponding to at least one net is collected with respect to each net. For example, the physical information about at least one wire corresponding to at least one net included in the selected path is collected. In some exemplary embodiments, the selected path may include a plurality of nets, and physical information about at least one wire corresponding to each net may be collected. In some exemplary embodiments, the selected path may include a single net, and physical information about at least one wire corresponding to the single net may be collected. In some exemplary embodiments, the at least one wire may include portions of the at least one wire on a plurality of metal layers, and the physical information may include length information of a portion of the at least one wire on each metal layer. See, e.g., FIG. 7. Hereinafter, in operation S330, collecting length information of each of a plurality of metal layers corresponding to the net included in the selected path will be mainly described.

In some exemplary embodiments, the P&R module 231 may collect length information of a plurality of metal layers corresponding to the net included in the selected path. In some exemplary embodiments, the PEX module 233 may collect length information of a plurality of metal layers corresponding to the net included in the selected path. In some exemplary embodiments, the STA module 235 may receive length information of a plurality of metal layers corresponding to the net included in the selected path from the P&R module 231 or the PEX module 233. In some exemplary embodiments, operation S330 may be performed on all the nets included in the selected path. However, the inventive concept is not limited thereto, and in some exemplary embodiments, operation S330 may be performed only on a portion of the nets included in the selected path.

In operation S340, a wire delay is calculated based on the physical information. For example with respect to at least one wire corresponding to the net, a wire delay is calculated based on the physical information of at least one wire. In some exemplary embodiments, the wire delay may be calculated based on the length information of the portion of the wire in the metal layer and the unit delay information of the metal layer. For example, the STA module 235 may calculate the wire delay of a portion of the wire in the m-th metal layer based on the length information of the m-th metal layer. However, the inventive concept is not limited thereto, and in some exemplary embodiments, operation S340 may be performed by the P&R module 231.

In operation S350, the wire delay is updated based on the process variation of the wire. For example, with respect to at least one wire corresponding to the net, the wire delay is updated based on the process variation of at least one wire. In some exemplary embodiments, the wire delay may be updated based on the RC scaling factor according to the process variation of the metal layer including the portion of the wire. For example, the STA module 235 may update the wire delay of a portion of the wire in the m-th metal layer based on the RC scaling factor according to the process variation of the m-th metal layer. However, the inventive concept is not limited thereto, and in some exemplary embodiments, operation S350 may be performed by the P&R module 231.

In operation S360, a timing slack is calculated using the updated wire delay. In some exemplary embodiments, with respect to each of a plurality of metal layers, a wire delay skew according to the difference between the wire delay of the metal layer and the updated wire delay may be calculated, and a timing slack may be calculated by using the wire delay skews of a plurality of metal layers. For example, the timing slack may be a hold slack or a setup slack. For example, the STA module 235 may calculate the wire delay skew of portions of the wire on the m-th metal layer and calculate the timing slack by using the wire delay skews of the portions of the wire on all the metal layers corresponding to the net. However, the inventive concept is not limited thereto, and in some exemplary embodiments, operation S360 may be performed by the P&R module 231. After operation S360, operation S320 may be performed on the next path among the timing critical paths that are determined.

Figure 12:
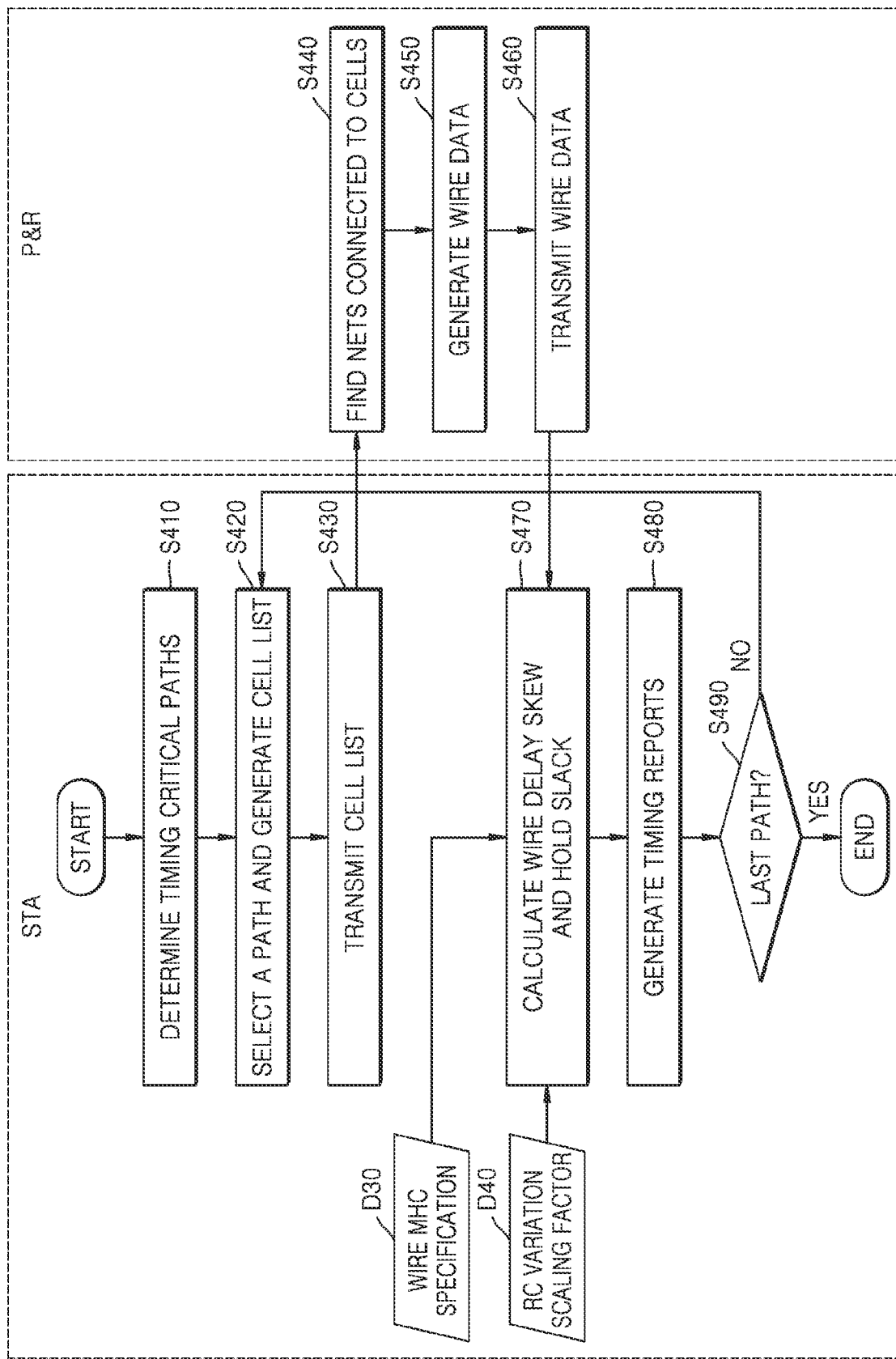
FIG. 12 is a flow diagram illustrating an operation between a placing and routing (P&R) module and an static timing analysis (STA) module of the integrated circuit design system of FIG. 6 according to an exemplary embodiment.

FIG. 12 is a flow diagram illustrating the operation between the P&R module 231 and the STA module 235 of FIG. 6 according to an exemplary embodiment.

Referring to FIG. 12, operations S310 to S330 and S370 to S390 may be sequentially performed, for example, by the STA module 235 of FIG. 6, and operations S340 to S360 may be sequentially performed, for example, by the P&R module 231 of FIG. 6. Hereinafter, a timing analysis operation will be described with additional reference to FIGS. 6 to 11.

In operation S410, the STA module 235 may determine timing critical paths. The STA module 235 may determine the timing critical paths by performing a timing analysis on the timing paths included in the integrated circuit. In operation S420, the STA module 235 may select one of the timing critical paths and generate a cell list including the standard cells related to the selected path. In operation S430, the STA module 235 may transmit the cell list to the P&R module 231.

In operation S440, the P&R module 231 may find the nets connected to the standard cells included in the cell list. In operation S450, the P&R module 231 may generate wire data including layer information of at least one wire corresponding respectively to the nets and physical information of the at least one wire. In some exemplary embodiments, the P&R module 231 may generate wire data representing a layer of a wire corresponding to each of a plurality of nets, that is, a type of the wire in a layout data generating operation, and generate wire data corresponding to a particular net by measuring a length of a wire corresponding to a particular net according to the request of the STA module 235 in operation S450. In some exemplary embodiments, the P&R module 231 may generate total wire data including a type of a wire corresponding to each of a plurality of nets and length information of the wire in a layout data generating operation, and extract wire data corresponding to a particular net according to the request of the STA module 235 from the total wire data in operation S450. In operation S460, the P&R module 231 may transmit the generated wire data to the STA module 235.

In operation S470, the STA module 235 may calculate a wire delay skew and a hold slack based on the wire data, the wire model-to-hardware correlation (MHC) specification D30, and the RC variation scaling factor D40. Operation S470 will be described in more detail with reference to FIG. 13. In operation S480, the STA module 235 may generate a timing report. For example, the timing report may include a wire MHC slack, a worst metal layer, a wire delay skew for each metal layer, an RC variation scaling factor for each metal layer, and a hold slack difference for each metal layer. In operation S490, the STA module 235 may determine whether the path selected in operation S420 is the last path among the timing critical paths determined in operation S410. As a result of the determination, when the path is not the last path, operation S420 is performed, and when the path is the last path, the timing analysis operation is ended.

Figure 13:
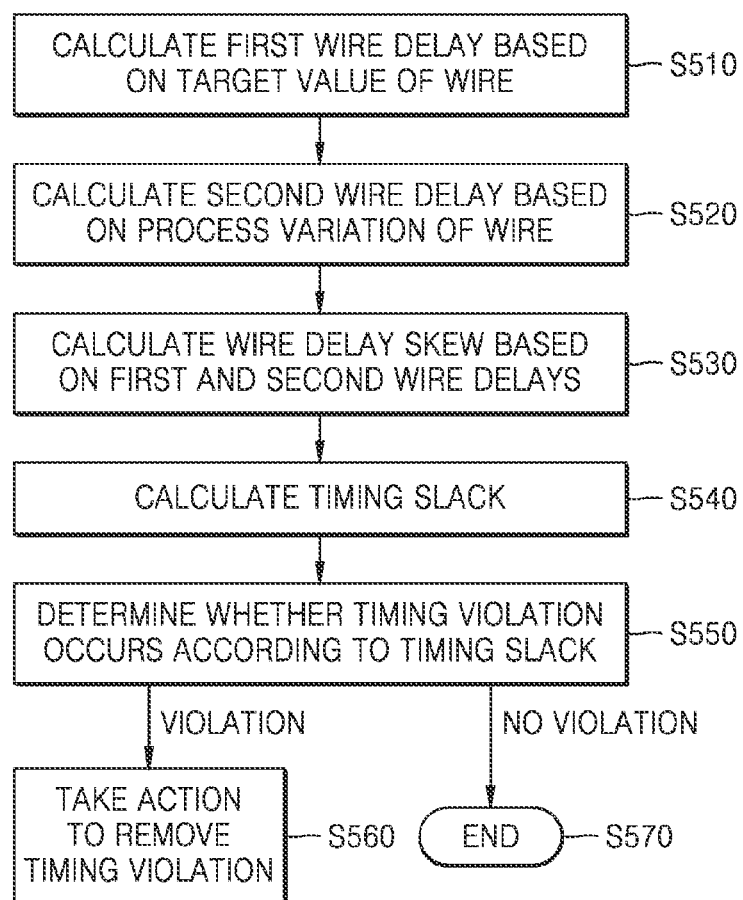
FIG. 13 is a flow diagram illustrating an integrated circuit timing analysis method according to an exemplary embodiment.

FIG. 13 is a flow diagram illustrating an integrated circuit timing analysis method according to an exemplary embodiment.

Referring to FIG. 13, the timing analysis method according to the exemplary embodiment shown in FIG. 13 may correspond to an implementation example of operation S220 of FIG. 4. For example, the timing analysis method according to the exemplary embodiment shown in FIG. 13 may be sequentially performed by the STA module 235 of FIG. 6. Hereinafter, an operation of calculating a wire delay corresponding to the net N4 by the timing analyzer TA will be described with reference to FIGS. 6 to 13.

In operation S510, a first wire delay is calculated based on a target value of a wire. In some exemplary embodiments, a net may correspond to a plurality of wires, and operation S510 may be performed on each of the plurality of wires. For example, it may be assumed that a first wire delay $\delta_m$ on the m-th metal layer is proportional to a length $\lambda_m$ of the wire on the m-th metal layer and a unit delay $\tau_m$ of the m-th metal layer. Thus, the first wire delay $\delta_m$ of the wire on the m-th metal layer may be represented as Equation 7 below.

$$\delta_m = \beta \times \tau_m \times \lambda_m \qquad \text{Equation 7}$$

For example, it may be said that a first total wire delay $\delta_{total}$ corresponding to the net N4 (of FIG. 7) corresponds to the sum of the first wire delays $\delta_2$ to $\delta_5$ of the portions of the wire on the second to fifth metal layers M2 to M5 (i.e., $\delta_{total} = \delta_2 + \delta_3 + \delta_4 + \delta_5$). Thus, the first total wire delay $\delta_{total}$ corresponding to the net N4 may be represented as Equation 8 below.

$$\delta_{total} = \beta \times (\tau_2 \times \lambda_2 + \tau_3 \times \lambda_3 + \tau_4 \times \lambda_4 + \tau_5 \times \lambda_5) \qquad \text{Equation 8}$$

From Equation 8, $\beta$ may be represented as Equation 9 below.

$$\beta = \frac{\delta_{total}}{\tau_2 \times \lambda_2 + \tau_3 \times \lambda_3 + \tau_4 \times \lambda_4 + \tau_5 \times \lambda_5} = \frac{\delta_{total}}{\sum_{r=1}^{M} \tau_r \times \lambda_r} \qquad \text{Equation 9}$$

From Equations 8 and 9, the first wire delay $\delta_m$ of the wire on the m-th metal layer may be represented as Equation 10 below.

$$\delta_m = \frac{\delta_{total}}{\sum_{r=1}^{M} \tau_r \times \lambda_r} \times \tau_m \times \lambda_m \qquad \text{Equation 10}$$

In operation S520, a second wire delay is calculated based on a process variation of the wire. In some exemplary embodiments, a net may correspond to a plurality of wires, and operation S520 may be performed on each of the plurality of wires. Specifically, an operation of calculating the second wire delay may be performed using various equations. In some exemplary embodiments, the second wire delay $\delta'_m$ of a portion of the wire on the m-th metal layer may be represented as Equation 11 below.

$$\delta'_m = \frac{\delta_{total}}{\sum_{r=1}^{M}(\tau_r \times \sigma_r) \times \lambda_r} \times (\tau_m \times \sigma_m) \times \lambda_m \qquad \text{Equation 11}$$

Herein, $\sigma_m$ is a metal RC variation scaling factor of the m-th metal layer and may be set by the user. Also, in some exemplary embodiments, Equation 11 may be modified by further considering physical information of a via corresponding to the net, for example, the number of vias or a type of the via, and the second wire delay $\delta'_m$ may be calculated by using the modified Equation 11. Also, in some exemplary embodiments, Equation 11 may be modified by further considering an RC variation of a via corresponding to the net, and the second wire delay $\delta'_m$ may be calculated by using the modified Equation 11.

In some exemplary embodiments, the second wire delay $\delta'_m$ of a portion of the wire on the m-th metal layer may be represented as Equation 12 below.

$$\delta'_m = \frac{\delta_{total}}{\sum_{r=1}^{M}\tau_r \times \lambda_r} \times (\tau_m \times \sigma_m) \times \lambda_m \qquad \text{Equation 12}$$

Also, in some exemplary embodiments, Equation 12 may be modified by further considering physical information of a via corresponding to the net, for example, a scaling factor according to a type of the via or the number of vias, and the second wire delay $\delta'_m$ may be calculated by using the modified Equation 12. Also, in some exemplary embodiments, Equation 12 may be modified by further considering an RC variation of a via corresponding to the net, and the second wire delay $\delta'_m$ may be calculated by using the modified Equation 12.

In operation S530, a wire delay skew is calculated based on the first and second wire delays. In some exemplary embodiments, a net may correspond to a plurality of wires, and operation S530 may be performed on each of the plurality of wires. For example, when the second wire delay $\delta'_m$ is calculated according to Equation 11, the wire delay skew $\Delta_m$ of a portion of the wire on the m-th metal layer may be represented as Equation 13 below based on the first and second wire delays $\delta_m$ and $\delta'_m$.

$$\Delta_m = \delta_m - \delta'_m = \qquad \text{Equation 13}$$
$$\frac{\delta_{total}}{\sum_{r=1}^{M}\tau_r \times \lambda_r} \times \tau_m \times \lambda_m - \frac{\delta_{total}}{\sum_{r=1}^{M}(\tau_r \times \sigma_r) \times \lambda_r} \times (\tau_m \times \sigma_m) \times \lambda_m$$

For example, when the second wire delay $\delta'_m$ is calculated according to Equation 12, the wire delay skew $\Delta_m$ of a portion of the wire on the m-th metal layer may be represented as Equation 14 below based on the first and second wire delays $\delta_m$ and $\delta'_m$.

$$\Delta_m = \delta_m - \delta'_m = \qquad \text{Equation 14}$$
$$\frac{\delta_{total}}{\sum_{r=1}^{M}\tau_r \times \lambda_r} \times \tau_m \times \lambda_m - \frac{\delta_{total}}{\sum_{r=1}^{M}\tau_r \times \lambda_r} \times (\tau_m \times \sigma_m) \times \lambda_m$$

For example, when a process variation occurs only in the m-th metal layer among all the metal layers and a variation does not occur in the other metal layers, the total wire delay skew may be equal to the wire delay skew $\Delta m$ of the portion of the wire on the m-th metal layer.

In operation S540, a timing slack is calculated. For example, the timing slack of the net may be calculated based on the wire delay skews corresponding respectively to a plurality of wires corresponding to the net. In some exemplary embodiments, the timing slack may be calculated by applying a root sum square (RSS) method to the wire delay skews. For example, the timing slack may be calculated as Equation 15 below.

$$\Delta = -1 \times \sqrt{\sum_{m=1}^{n}\Delta_m^2} \qquad \text{Equation 15}$$

In operation S550, it is determined whether a timing violation occurs according to the timing slack. In some exemplary embodiments, as a result of the determination, when a timing violation occurs, an action may be taken to remove the timing violation (S560). For example, in some exemplary embodiments, an engineering change order (ECO) may be performed to remove the timing violation. In some exemplary embodiments, when a timing violation occurs, a timing margin of the timing path may be additionally secured by using a timing engine such as clock tree synthesis (CTS). In some exemplary embodiments, when a timing violation occurs, a timing margin of the timing path may be additionally secured by using optimization in a P&R tool. In some exemplary embodiments, when a timing violation occurs, the metal routing may be modified. For example, the length of a metal layer may be modified or a portion of the wire in the metal layer may be changed to another metal layer. As a result of the determination, when a timing violation does not occur, the timing analysis operation may be ended (S570).

Figure 14:
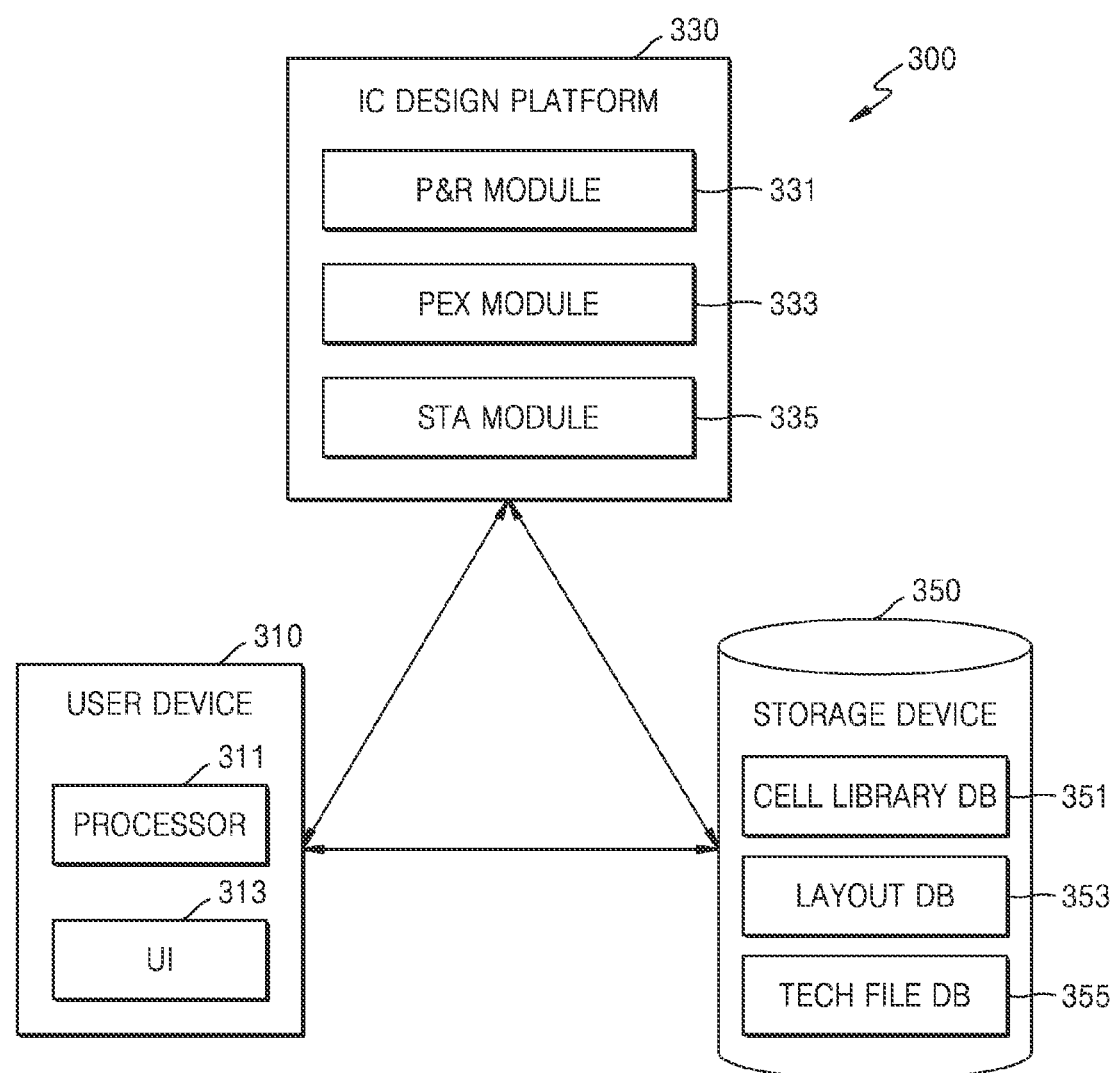
FIG. 14 is a block diagram illustrating an integrated circuit design system according to an exemplary embodiment.

FIG. 14 is a block diagram illustrating a computing system 300 for designing an integrated circuit according to an exemplary embodiment.

Referring to FIG. 14, an integrated circuit design system 300 may include a user device 310, an integrated circuit design platform 330, and a storage device 350. For example, the integrated circuit design system 300 may perform an integrated circuit design operation including operations S110 to S140 of FIG. 1 or operations S210 and S220 of FIG. 4. In the exemplary embodiment shown in FIG. 14, at least one of the user device 310, the integrated circuit design platform 330, and the storage device 350 may be a separate device, and the user device 310, the integrated circuit design platform 330, and the storage device 350 may be connected through wireless/wired communication or network. In some exemplary embodiments, at least one of the user device 310, the integrated circuit design platform 330, and the storage device 350 may be spaced apart from each other.

The user device 310 may include a processor 311 and a user interface (UI) 313. The processor 311 may include one or more microprocessors or central processing units (CPUs) and may drive the integrated circuit design platform 330 according to a user input received through the user interface 313. The integrated circuit design platform 330 may include a P&R module 331, a PEX module 333, and an STA module 335 as a set of computer-readable instructions for designing an integrated circuit. The P&R module 331, the PEX module 333, and the STA module 335 may correspond respectively to the P&R module 231, the PEX module 233, and the STA module 235 of FIG. 5. The storage device 350 may include a cell library DB 351, a layout DB 353, and a technology file DB 355. The cell library DB 351, the layout DB 353, and the technology file DB 355 may correspond respectively to the cell library DB 271, the layout DB 273, and the technology (tech) file DB 275 of FIG. 6.

Figure 15:
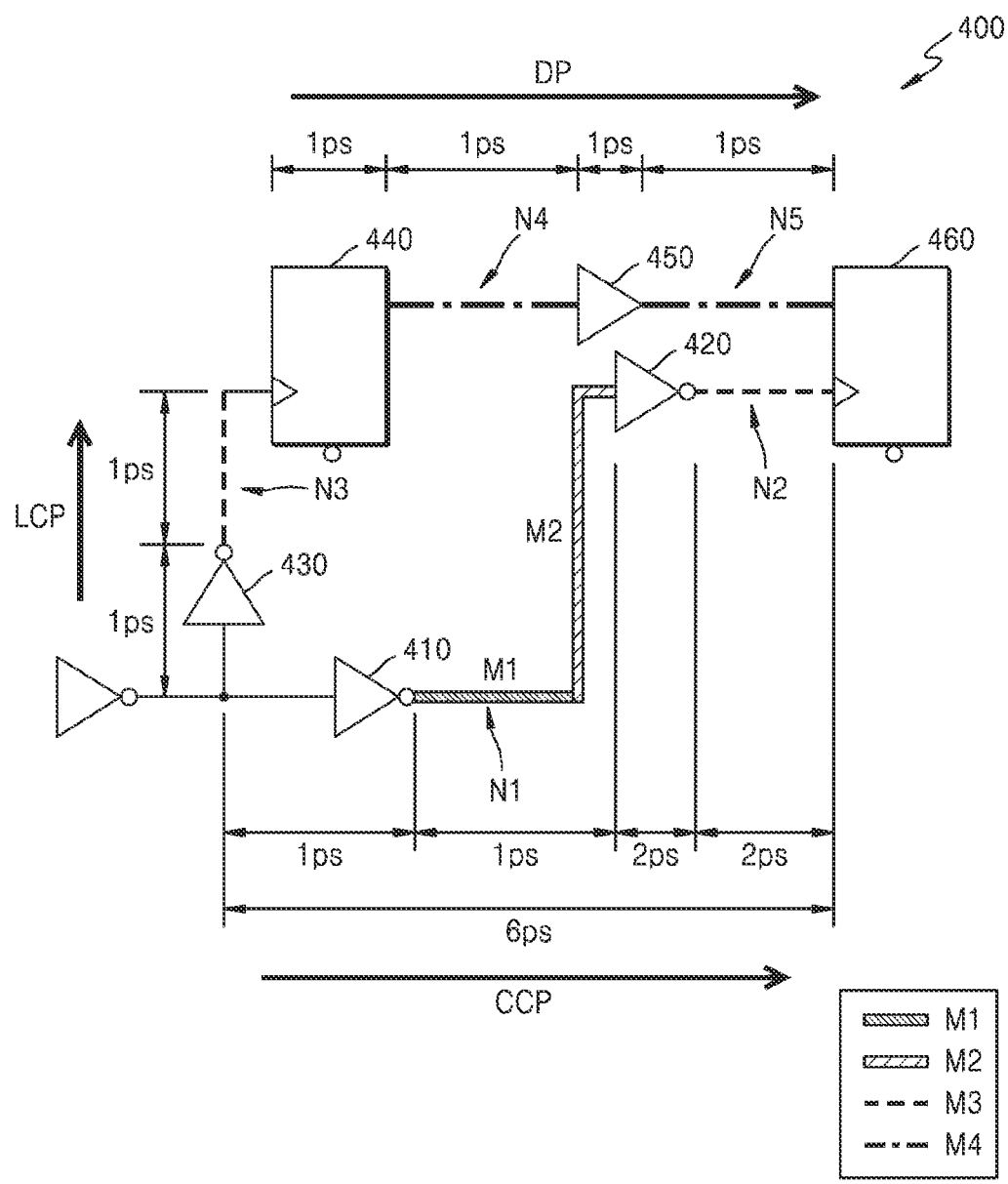
FIG. 15 illustrates an integrated circuit according to an exemplary embodiment.

FIG. 15 illustrates an integrated circuit 400 according to an exemplary embodiment.

Referring to FIG. 15, the integrated circuit 400 may include a first cell 410, a second cell 420, a third cell 430, a fourth cell 440, a fifth cell 450 and a sixth cell 460, and a first net N1, a second net N2, a third net N3, a fourth net N4, and a fifth net N5. The first net N1 includes a wire on a first metal layer M1 and a wire on a second metal layer M2. The second net N2 includes a wire on a third metal layer M3. The third net N3 includes a wire on the third metal layer M3, and the fourth and fifth nets N4 and N5 each includes a wire on a fourth metal layer M4. A capture clock path CCP may include the first cell 410 and the second cell 420, and the first net N1 and the second net N2. For example, in the capture clock path CCP, a cell delay may be 3 ps, a net delay may be 3 ps, and a total delay may be 6 ps. A launch clock path LCP may include the third cell 430 and the third net N3. For example, in the launch clock path LCP, a cell delay may be 1 ps, a net delay may be 1 ps, and a total delay may be 2 ps. A data path DP may include the fourth cell 440 and the fifth cell 450, and the fourth net N4 and the fifth net N5. For example, in the data path DP, a cell delay may be 2 ps, a net delay may be 2 ps, and a total delay may be 4 ps. Hereinafter, a timing analysis operation on the integrated circuit 400 will be described with reference to FIGS. 14 to 17C.

FIG. 16 illustrates wire data D10' for the integrated circuit 400 of FIG. 15.

Referring to FIG. 16, the first net N1 may correspond to the first and second metal layers M1 and M2, the length of the wire on the first metal layer M1 used to implement the first net N1 may be $\lambda_1$, and the length of the wire on the second metal layer M2 used to implement the first net N1 may be $\lambda_2$. The second and third nets N2 and N3 may correspond to the third metal layer M3, the length of the wire on the third metal layer M3 used to implement the second net N2 may be $\lambda_{3a}$, and the length of the wire on the third metal layer M3 used to implement the third net N3 may be $\lambda_{3b}$. The fourth and fifth nets N4 and N5 may correspond to the fourth metal layer M4, the length of the wire on the fourth metal layer M4 used to implement the fourth net N4 may be $\lambda_{4a}$, and the length of the wire on the fourth metal layer M4 used to implement the fourth net N4 may be $\lambda_{4b}$.

FIGS. 17A to 17C illustrate an example of a timing analysis for the integrated circuit 400 of FIG. 15 according to an exemplary embodiment. For example, a process variation may occur only in the first and second metal layers M1 and M2 among the first to fourth metal layers M1 to M4 corresponding to the first to fifth nets N1 to N5 included in the integrated circuit 400, and a process variation may not occur in the third and fourth metal layers M3 and M4. In this case, a wire delay may vary only in the first net N1 implemented by the first and second metal layers M1 and M2. For example, the resistance of each of the first and second metal layers M1 and M2 may increase by 15% in comparison with a modeled target value. Hereinafter, the timing analysis operation will be described with reference to FIGS. 6 and 15 to 17C.

FIG. 17A illustrates an operation of calculating the first wire delay corresponding to the first net N1. The STA module 235 may receive the wire data D10' including the length $\lambda_1$ of the wire on the first metal layer M1 and the length $\lambda_2$ of the wire on the second metal layer M2 from the P&R module 231. For example, $\lambda_1$ may be 40 μm, and $\lambda_2$ may be 60 μm. Also, the STA module 235 may receive first unit delay information $\tau_1$ and second unit delay information $\tau_2$ included in a technology file. The first unit delay information $\tau_1$ represents a delay per unit length of the first metal layer M1, and the second unit delay information $\tau_2$ represents a delay per unit length of the second metal layer M2. For example, $\tau_1$ may be 19.3 fs/μm, and $\tau_2$ may be 3.3 fs/μm.

As illustrated in FIG. 15, when a delay of the first net N1 is 1 ps, the first wire delay 61 of the first metal layer M1 may be calculated as 795.9 fs (=1000*19.3*40/(19.3*40+3.3*60)) and the first wire delay 62 of the second metal layer M2 may be calculated as 204.1 fs (=1000*3.3*60/(19.3*40+3.3*60)) from Equation 10 above.

FIG. 17B illustrates an operation of calculating a second wire delay corresponding to the first net N1. The STA module 235 may receive a first RC variation scaling factor $\sigma_1$ and a second RC variation scaling factor $\sigma_2$ as a user input. When the resistance of each of the first and second metal layers M1 and M2 increases by 15% in comparison with a modeled target value, both the first and second RC variation scaling factors $\sigma_1$ and $\sigma_2$ may be 1.15. For example, the second wire delay may be calculated by using Equation 11 or 12 above. In this case, the second wire delay $\delta_1'$ of the wire of the first metal layer M1 may be calculated as 915.3 fs, and the second wire delay $\delta_2'$ of the wire of the second metal layer M2 may be calculated as 234.7 fs. However, the inventive concept is not limited thereto, and an equation for calculating the second wire delay may vary according to various exemplary embodiments.

FIG. 17C illustrates an operation of calculating a wire delay skew corresponding to the first net N1. Referring to FIG. 17C, a wire delay skew $\Delta_1$ corresponding to the first metal layer M1 is −119.4 fs, and a wire delay skew $\Delta_2$ corresponding to the second metal layer M2 is −30.6 fs. For example, a hold slack for the first net N1 may be calculated by using Equation 15 above. Accordingly, the hold slack may be calculated as −125 fs ($=-\sqrt{(-119.4)^2+(-30.6)^2}$).

Figure 18:
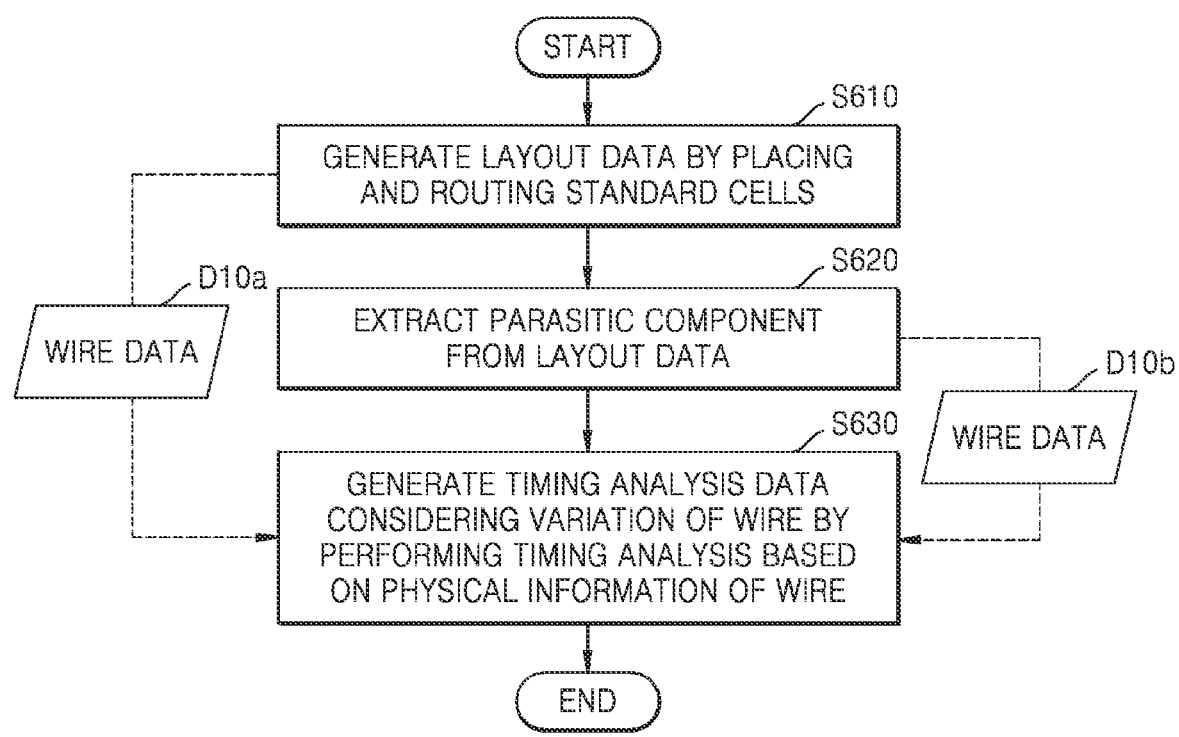
FIG. 18 is a flow diagram illustrating an integrated circuit design method according to an exemplary embodiment.

FIG. 18 is a flow diagram illustrating an integrated circuit design method according to an exemplary embodiment.

Referring to FIG. 18, the integrated circuit design method may correspond to an implementation example of FIG. 1 as a method of performing a timing analysis of an integrated circuit in consideration of wire variations. The exemplary embodiment shown in FIG. 18 may correspond to a modified exemplary embodiment of the method illustrated in FIG. 4. Thus, the descriptions made above with reference to FIGS. 4 to 17C may also be applied to the exemplary embodiment shown in FIG. 18, and redundant descriptions thereof will be omitted for conciseness.

In operation S610, layout data of an integrated circuit is generated by placing and routing standard cells defining the integrated circuit. In some exemplary embodiments, in operation S610, wire data D10a corresponding to a net included in the integrated circuit may be further generated. The wire data D10a may include layer information of at least one wire corresponding to a net included in the layout of the integrated circuit and physical information of the at least one wire. For example, the wire data may include length information of a wire.

In operation S620, parasitic components are extracted from the layout data. In some exemplary embodiments, in operation S620, wire data D10b corresponding to a net included in the integrated circuit may be further generated. The wire data D10b may include layer information of at least one wire corresponding to a net included in the layout of the integrated circuit and physical information of the at least one wire. For example, the wire data may include length information of a wire.

The wire data D10*a* generated in operation S610 and the wire data D10*b* generated in operation S620 may be substantially equal to each other. Thus, in some exemplary embodiments, when the wire data D10*a* is generated in operation S610, the wire data D10*b* may not be generated in operation S620. Also, in some exemplary embodiments, when the wire data D10*b* is generated in operation S620, the wire data D10*a* may not be generated in operation S610. In this manner, the wire data D10*a* and the wire data D10*b* may be selectively generated.

In operation S630, timing analysis data reflecting process variations of the wire is generated by performing a timing analysis based on the physical information of the wire. In some exemplary embodiments, the physical information of the wire may be included in the wire data D10*a* generated in operation S610. Thus, in operation S630, the physical information may be acquired from the wire data D10*a*. In some exemplary embodiments, the physical information of the wire may be included in the wire data D10*b* generated in operation S620. Thus, in operation S630, the physical information may be acquired from the wire data D10*b*. In some exemplary embodiments, a wire delay skew of the timing path may be calculated based on a time constant scaling factor based on the process variations of the wire, unit delay information representing a delay per unit length of the wire, and physical information thereof. In some exemplary embodiments, the integrated circuit design method may further include an operation of performing an engineering change order (ECO) according to the timing analysis data. In some exemplary embodiments, in the design method, the CTS or optimization in the P&R tool may be again performed according to the timing analysis data.

Figure 19:
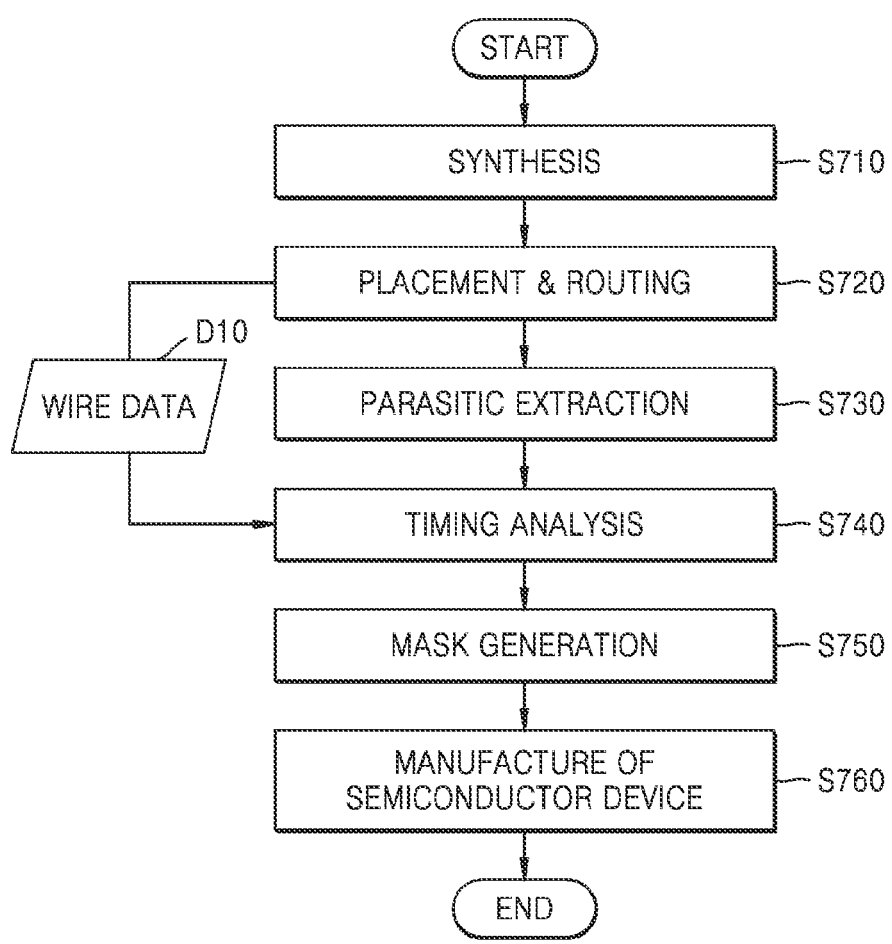
FIG. 19 is a flow diagram illustrating a semiconductor device manufacturing method according to an exemplary embodiment.

FIG. 19 is a flow diagram illustrating a semiconductor device manufacturing method according to an exemplary embodiment.

Referring to FIG. 19, the semiconductor device manufacturing method may be divided into an integrated circuit design process and an integrated circuit manufacturing process. The integrated circuit design process may include operations S710 to S740, the integrated circuit manufacturing process may include operations S750 and S760, and the integrated circuit manufacturing process may be performed in a semiconductor process module as an operation of manufacturing a semiconductor device according to an integrated circuit based on layout data. The semiconductor device manufacturing method according to the exemplary embodiment shown in FIG. 19 may manufacture a semiconductor device by performing the integrated circuit design method described above with reference to FIGS. 1 to 18. Specifically, operations S710 to S740 may correspond respectively to operations S110 to S140 of FIG. 1, and redundant descriptions thereof will be omitted for conciseness.

In operation S750, a mask is generated. The mask may be generated based on the layout data. Specifically, optical proximity correction (OPC) may be first performed based on the layout data, and the OPC may refer to a process of modifying the layout by reflecting an error according to an optical proximity effect. Subsequently, a mask may be manufactured according to the layout modified according to the OPC performance results. In this case, a mask may be manufactured by using the layout reflecting the OPC, for example, the graphic data system (GDS) II reflecting the OPC.

In operation S760, a semiconductor device including the integrated circuit is manufactured. The semiconductor device may be manufactured by using the mask. Specifically, a semiconductor device including the integrated circuit is formed by performing various semiconductor processes on a semiconductor substrate such as a wafer by using a plurality of masks. For example, a process using a mask may represent a patterning process based on a lithography process. By the patterning process, a desired pattern may be formed on a semiconductor substrate or a material layer. The semiconductor processes may include a deposition process, an etching process, an ion process, and a cleaning process. Also, the semiconductor process may include a packaging process of mounting a semiconductor device on a PCB and sealing the same with a sealant, and may include a test process of testing a semiconductor device or a package.

Figure 20:
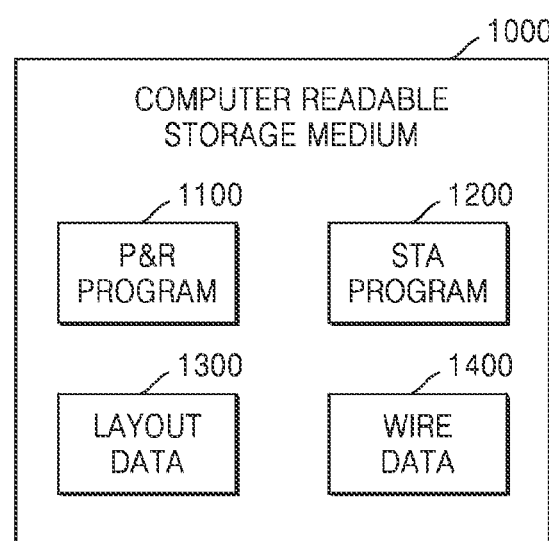
FIG. 20 illustrates a computer-readable storage medium according to an exemplary embodiment.

FIG. 20 illustrates a computer-readable storage medium 1000 according to an exemplary embodiment.

Referring to FIG. 20, the storage medium 1000 may store a P&R program 1100, an STA program 1200, layout data 1300, and wire data 1400. The storage medium 1000 may be a computer-readable storage medium, and may include a storage medium that may be read by a computer while being used to provide instructions and/or data to the computer. For example, the computer-readable storage medium 1000 may include a magnetic or optical medium such as disk, tape, CD-ROM, DVD-ROM, CD-R, CD-RW, DVD-R, or DVD-RW, a volatile or nonvolatile memory such as RAM, ROM, or flash memory, a nonvolatile memory accessible through a USB interface, and a microelectromechanical system (MEMS). The computer-readable storage medium may be inserted into the computer, may be integrated into the computer, or may be connected with the computer through a communication medium such as a network and/or a wireless link.

The P&R program 1100 may include a plurality of instructions for performing a method of generating layout data of an integrated circuit by using a standard cell library according to the exemplary embodiments described above. For example, the P&R program 1100 may be used to perform operation S120 of FIG. 1, operation S210 of FIG. 4, operations S440 to S460 of FIG. 12, operation S610 of FIG. 18, or operation S720 of FIG. 19.

The STA program 1200 may include a plurality of instructions for performing a timing analysis method according to the exemplary embodiments described above. For example, the STA program 1200 may be used to perform operation S140 of FIG. 1, operation S220 of FIG. 4, operations S410 to S430 and S470 to S490 of FIG. 12, operations S310, S320, and S340 to S360 of FIG. 11, operations S510 to S540 of FIG. 13, operation S630 of FIG. 18, or operation S740 of FIG. 19.

The layout data 1300 may include physical information about the layout generated by the P&R operation. For example the layout data 1300 may include the space values and the width values of conductive patterns constituting a signal net. The wire data 1400 may include layer information of at least one wire corresponding to each of the nets included in the integrated circuit and physical information of the at least one wire. Also, the wire data 1400 may include layer information of at least one via corresponding to each of the nets included in the integrated circuit and physical information of the at least one via. For example, the wire data 1400 may be generated by the P&R program 1100. However, the inventive concept is not limited thereto, and the wire data 1400 may be generated by a parasitic extraction program. Although FIG. 20 illustrates the layout data 1300 and the wire data 1400 separately, the inventive concept is not limited thereto. In some exemplary embodiments, the layout data 1300 may include the wire data 1400.

The exemplary embodiments of the inventive concept have been described above with reference to the drawings. Although particular terms are used herein to describe the exemplary embodiments, they are merely used to describe the technical idea of the inventive concept and are not intended to limit the scope of the inventive concept as described in the following claims. Therefore, those of ordinary skill in the art will understand that various modifications and other equivalent embodiments may be derived therefrom. Thus, the spirit and scope of the inventive concept should be defined by the appended claims.

While the inventive concept has been particularly shown and described with reference to exemplary embodiments thereof, it will be understood that various changes in form and details may be made therein without departing from the spirit and scope of the following claims.

What is claimed is:

1. A non-transitory computer-readable storage medium that stores computer program code which, when executed by at least one processor, causes the at least one processor to execute a plurality of tools for designing an integrated circuit (IC), the plurality of tools comprising:
    a placing and routing tool that generates layout data and wire data corresponding to a net included in the IC by placing and routing standard cells defining the IC, the wire data including physical information of a wire implementing the net; and
    a timing analysis tool that:
    calculates a wire delay with respect to the wire corresponding to the net, based on the physical information,
    updates the wire delay based on process variation of the wire, and
    calculates a timing slack by using the updated wire delay,
    wherein the physical information includes at least one of length information of the wire, width information of the wire, area information of the wire, space information of the wire, and shielding information of the wire, and
    wherein the process variation includes one or more of a resistance variation, a capacitance variation, and a via variation due to a manufacturing process of the wire.

2. The non-transitory computer-readable storage medium of claim 1, wherein the timing analysis tool further determines a timing critical path by performing a timing analysis on timing paths included in the IC.

3. The non-transitory computer-readable storage medium of claim 2, wherein the timing critical path is a path for which a hold violation occurs.

4. The non-transitory computer-readable storage medium of claim 2, wherein the timing analysis tool further collects a cell delay and a net delay for the timing critical path.

5. The non-transitory computer-readable storage medium of claim 4, wherein the placing and routing tool further collects length information of a plurality of metal layers corresponding to the net included in the timing critical path.

6. The non-transitory computer-readable storage medium of claim 5, wherein the timing analysis tool further:
    receives the length information of the plurality of metal layers corresponding to the net included in the timing critical path, from the placing and routing tool, and
    calculates the wire delay based on the length information.

7. The non-transitory computer-readable storage medium of claim 2, wherein the plurality of tools further comprises:
    a parasitic extraction tool that extracts parasitic components from the layout data.

8. The non-transitory computer-readable storage medium of claim 7, wherein the parasitic extraction tool further collects length information of a plurality of metal layers corresponding to the net included in the timing critical path.

9. The non-transitory computer-readable storage medium of claim 1, wherein the wire data includes layer information of at least one metal layer that implements the net, and physical information of the at least one metal layer.

10. The non-transitory computer-readable storage medium of claim 1, wherein the wire data comprises layer information of at least one via implementing the net and physical information of the at least one via.

11. A non-transitory computer-readable storage medium that stores computer program code which, when executed by at least one processor, causes the at least one processor to execute a plurality of tools for designing an integrated circuit (IC), the plurality of tools comprising:
    a placing and routing tool that generates layout data and wire data corresponding to a net included in the IC by placing and routing standard cells defining the IC, the wire data including physical information of a wire implementing the net; and
    a timing analysis tool that:
    calculates a first wire delay based on a target value of the wire,
    calculates a second wire delay based on process variation of the wire,
    calculates a wire delay skew based on the first wire delay and the second wire delay, calculates a timing slack based on the wire delay skew, and
    determines whether a timing violation occurs according to the timing slack,
    wherein the physical information includes at least one of length information of the wire, width information of the wire, area information of the wire, space information of the wire, and shielding information of the wire, and
    wherein the process variation includes one or more of a resistance variation, a capacitance variation, and a via variation due to a manufacturing process of the wire.

12. The non-transitory computer-readable storage medium of claim 11, wherein the placing and routing tool further performs an engineering change order to remove the timing violation, when the timing violation occurs.

13. The non-transitory computer-readable storage medium of claim 11, wherein the placing and routing tool further additionally secures a timing margin of a timing path by using a timing engine such as clock tree synthesis (CTS) to remove the timing violation, when the timing violation occurs.

14. The non-transitory computer-readable storage medium of claim 11, wherein the placing and routing tool further modifies metal routing of the wire to remove the timing violation, when the timing violation occurs.

15. The non-transitory computer-readable storage medium of claim 11, wherein the plurality of tools further comprises:
    a parasitic extraction tool that extracts parasitic components from the layout data.

16. The non-transitory computer-readable storage medium of claim 11, wherein the wire data includes layer information of at least one metal layer that implements the net, and physical information of the at least one metal layer.

17. The non-transitory computer-readable storage medium of claim 11, wherein the wire data comprises layer information of at least one via implementing the net and physical information of the at least one via.

18. An apparatus comprising:
at least one memory configured to store computer program code; and
at least one processor configured to access the at least one memory and operate according to the computer program code, the computer program code including at least:
placing and routing tool code configured to cause at least one of the at least one processor to generate layout data and wire data corresponding to a net included in the IC by placing and routing standard cells defining the IC, the wire data including physical information of a wire implementing the net and layer information of the wire;
parasitic extraction tool code configured to cause at least one of the at least one processor to extract parasitic components from the layout data; and
a timing analysis tool code configured to cause at least one of the at least one processor to perform a timing analysis on a timing path including the net based on the wire data,
wherein the physical information includes a process variation of the wire.

19. The apparatus of claim 18, wherein the physical information includes at least one of length information of the wire, width information of the wire, area information of the wire, space information of the wire, and shielding information of the wire.

20. The apparatus of claim 18, wherein the process variation includes one or more of a resistance variation, a capacitance variation, and a via variation due to a manufacturing process of the wire.

* * * * *